United States Patent
Nugent

(10) Patent No.: US 7,752,151 B2
(45) Date of Patent: *Jul. 6, 2010

(54) MULTILAYER TRAINING IN A PHYSICAL NEURAL NETWORK FORMED UTILIZING NANOTECHNOLOGY

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/100,622

(22) Filed: Apr. 10, 2008

(65) Prior Publication Data

US 2009/0228415 A1 Sep. 10, 2009

Related U.S. Application Data

(63) Continuation of application No. 10/748,546, filed on Dec. 30, 2003, now Pat. No. 7,392,230, which is a continuation-in-part of application No. 10/162,524, filed on Jun. 5, 2002, now abandoned.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. .............................. 706/15; 706/25; 706/26; 706/27; 706/33

(58) Field of Classification Search .................. 706/15
See application file for complete search history.

(56) References Cited

U.S. PATENT DOCUMENTS 2,707,223 A 4/1955 Hollman (Continued)

FOREIGN PATENT DOCUMENTS

EP 1 022 764 A1 1/2000

(Continued)

OTHER PUBLICATIONS

A Multi-layer ADaptive FUnction Neural Network (MADFUNN) for Analytical Function Recognition, Miao Kang; Palmer-Brown, D.; Neural Networks, 2006. IJCNN '06. International Joint Conference on Digital Object Identifier: 10.1109/IJCNN.2006.246895 Publication Year: 2006, pp. 1784-1789.*

(Continued)

*Primary Examiner*—Michael Holmes
(74) *Attorney, Agent, or Firm*—Kermit D. Lopez; Luis M. Ortiz; Ortiz & Lopez, PLLC

(57) ABSTRACT

A method for and system for training a connection network located between neuron layers within a multi-layer physical neural network. A multi-layer physical neural network can be formed having a plurality of inputs and a plurality outputs thereof, wherein the multi-layer physical neural network comprises a plurality of layers, wherein each layer comprises one or more connection networks and associated neurons. Thereafter, a training wave can be initiated across the connection networks associated with an initial layer of the multi-layer physical neural network which propagates thereafter through succeeding connection networks of succeeding layers of the neural network by successively closing and opening switches associated with each layer. One or more feedback signals thereof can be automatically provided to strengthen or weaken nanoconnections associated with each connection network.

20 Claims, 7 Drawing Sheets

U.S. PATENT DOCUMENTS

| | | | |
|---|---|---|---|
| 3,222,654 A | 12/1965 | Widrow | |
| 3,833,894 A | 9/1974 | Aviram et al. | |
| 4,802,951 A | 2/1989 | Clark et al. | |
| 4,926,064 A | 5/1990 | Tapang | |
| 4,974,146 A | 11/1990 | Works et al. | |
| 4,988,891 A | 1/1991 | Mashiko | |
| 5,315,162 A | 5/1994 | McHardy et al. | |
| 5,422,983 A | 6/1995 | Castelaz et al. | |
| 5,475,794 A | 12/1995 | Mashiko | |
| 5,589,692 A | 12/1996 | Reed | |
| 5,649,063 A | 7/1997 | Bose | |
| 5,670,818 A | 9/1997 | Forouhi et al. | |
| 5,706,404 A | 1/1998 | Colak | |
| 5,717,832 A | 2/1998 | Steimle et al. | |
| 5,761,115 A | 6/1998 | Kozicki et al. | |
| 5,783,840 A | 7/1998 | Randall et al. | |
| 5,812,993 A | 9/1998 | Ginosar et al. | |
| 5,896,312 A | 4/1999 | Kozicki et al. | |
| 5,904,545 A | 5/1999 | Smith et al. | |
| 5,914,893 A | 6/1999 | Kozicki et al. | |
| 5,951,881 A | 9/1999 | Rogers et al. | |
| 5,978,782 A | 11/1999 | Neely | |
| 6,026,358 A | 2/2000 | Tomabechi | |
| 6,084,796 A | 7/2000 | Kozicki et al. | |
| 6,128,214 A | 10/2000 | Kuekes et al. | |
| 6,245,630 B1 | 6/2001 | Ishikawa | |
| 6,248,529 B1 | 6/2001 | Connolly | |
| 6,256,767 B1 | 7/2001 | Kuekes et al. | |
| 6,282,530 B1 | 8/2001 | Huang | |
| 6,294,450 B1 | 9/2001 | Chen et al. | |
| 6,314,019 B1 | 11/2001 | Kuekes et al. | |
| 6,330,553 B1 | 12/2001 | Uchikawa et al. | |
| 6,335,291 B1 | 1/2002 | Freeman | |
| 6,339,227 B1 | 1/2002 | Ellenbogen | |
| 6,359,288 B1 | 3/2002 | Ying et al. | |
| 6,363,369 B1 | 3/2002 | Liaw et al. | |
| 6,383,923 B1 | 5/2002 | Brown et al. | |
| 6,389,404 B1 | 5/2002 | Carson et al. | |
| 6,407,443 B2 | 6/2002 | Chen et al. | |
| 6,418,423 B1 | 7/2002 | Kambhatla et al. | |
| 6,420,092 B1 | 7/2002 | Yang et al. | |
| 6,422,450 B1 | 7/2002 | Zhou et al. | |
| 6,423,583 B1 | 7/2002 | Avouris et al. | |
| 6,424,961 B1 | 7/2002 | Ayala | |
| 6,426,134 B1 | 7/2002 | Lavin et al. | |
| 6,536,106 B1 | 3/2003 | Jackson et al. | |
| 6,620,346 B1 | 9/2003 | Schultz et al. | |
| 6,798,692 B2 | 9/2004 | Kozicki et al. | |
| 6,855,329 B1 | 2/2005 | Shakesheff et al. | |
| 6,889,216 B2 | 5/2005 | Nugent | |
| 6,995,649 B2 | 2/2006 | Nugent | |
| 7,028,017 B2 | 4/2006 | Nugent | |
| 7,039,619 B2 | 5/2006 | Nugent | |
| 7,107,252 B2 | 9/2006 | Nugent | |
| 7,392,230 B2 * | 6/2008 | Nugent | 706/15 |
| 7,409,375 B2 * | 8/2008 | Nugent | 706/26 |
| 7,412,428 B2 * | 8/2008 | Nugent | 706/26 |
| 7,420,396 B2 * | 9/2008 | Nugent | 326/104 |
| 7,426,501 B2 * | 9/2008 | Nugent | 706/26 |
| 7,502,769 B2 * | 3/2009 | Nugent | 706/26 |
| 7,599,895 B2 * | 10/2009 | Nugent | 706/14 |
| 2001/0004471 A1 | 6/2001 | Zhang | |
| 2001/0023986 A1 | 9/2001 | Mancevski | |
| 2001/0024633 A1 | 9/2001 | Lee et al. | |
| 2001/0031900 A1 | 10/2001 | Margrave et al. | |
| 2001/0041160 A1 | 11/2001 | Margrave et al. | |
| 2001/0044114 A1 | 11/2001 | Connolly | |
| 2002/0001905 A1 | 1/2002 | Choi et al. | |
| 2002/0004028 A1 | 1/2002 | Margrave et al. | |
| 2002/0004136 A1 | 1/2002 | Gao et al. | |
| 2002/0030205 A1 | 3/2002 | Varshavsky | |
| 2002/0075126 A1 | 6/2002 | Reitz et al. | |
| 2002/0086124 A1 | 7/2002 | Margrave et al. | |
| 2002/0090468 A1 | 7/2002 | Goto et al. | |
| 2002/0102353 A1 | 8/2002 | Mauthner et al. | |
| 2003/0031438 A1 | 2/2003 | Kambe et al. | |
| 2003/0177450 A1 | 9/2003 | Nugent | |
| 2003/0236760 A1 | 12/2003 | Nugent | |
| 2004/0039717 A1 | 2/2004 | Nugent | |
| 2004/0150010 A1 | 8/2004 | Snider | |
| 2004/0153426 A1 | 8/2004 | Nugent | |
| 2004/0162796 A1 | 8/2004 | Nugent | |
| 2004/0193558 A1 | 9/2004 | Nugent | |

FOREIGN PATENT DOCUMENTS

| | | |
|---|---|---|
| EP | 1 046 613 A2 | 4/2000 |
| EP | 1 069 206 A2 | 1/2001 |
| EP | 0 989 579 A3 | 3/2001 |
| EP | 1 100 106 A2 | 5/2001 |
| EP | 1 115 135 A1 | 7/2001 |
| EP | 1 134 304 A2 | 9/2001 |
| RU | 2071126 C1 | 12/1996 |
| WO | WO 00/44094 A1 | 7/2000 |
| WO | WO 03/017282 A1 | 2/2003 |

OTHER PUBLICATIONS

Email classification: Solution with back propagation technique, Taiwo Ayodele; Shikun Zhou; Khusainov, R.; Internet Technology and Secured Transactions, 2009. ICITST 2009. International Conference for Publication Year: 2009 , pp. 1-6.*

A comparison of connectionist and traditional methods applied to phrase classification and grammaticality determination Wyard, P.; Warren, N.; Artificial Neural Networks, 1991., Second International Conference on Publication Year: 1991 , pp. 190-194.*

Peter Weiss, "Circuitry in a Nanowire: Novel Growth Method May Transform Chips," Science News Online, vol. 161, No. 6; Feb. 9, 2002.

Press Release, "Nanowire-based electronics and optics comes one step closer," Eureka Alert, American Chemical Society; Feb. 1, 2002.

Weeks et al., "High-pressure nanolithography using low-energy electrons from a scanning tunneling microscope," Institute of Physics Publishing, Nanotechnology 13 (2002), pp. 38-42; Dec. 12, 2001.

CMP Cientifica, "Nanotech: the tiny revolution"; CMP Cientifica, Nov. 2001.

Diehl, et al., "Self-Assembled, Deterministic Carbon Nanotube Wiring Networks," Angew. Chem. Int. Ed. 2002, 41, No. 2.

G. Pirio, et al., "Fabrication and electrical characteristics of carbon nanotube field emission microcathodes with an integrated gate electrode," Institute of Physics Publishing, Nanotechnology 13 (2002), pp. 1-4, Oct. 2, 2001.

Leslie Smith, "An Introduction to Neural Networks," Center for Cognitive and Computational Neuroscience, Dept. of Computing & Mathematics, University of Stirling, Oct. 25, 1996; http//www.cs.stir.ac.uk/~lss/NNIntro/InvSlides.html.

V. Derycke et al., "Carbon Nanotube Inter- and Intramolecular Logic Gates," American Chemical Society, Nano Letters, XXXX, vol. 0, No. 0, A-D.

Mark K. Anderson, "Mega Steps Toward the Nanochip," Wired News, Apr. 27, 2001.

Collins et al., "Engineering Carbon Nanotubes and Nanotube Circuits Using Electrical Breakdown," Science, vol. 292, pp. 706-709, Apr. 27, 2001.

Landman et al., "Metal-Semiconductor Nanocontacts: Silicon Nanowires," Physical Review Letters, vol. 85, No. 9, Aug. 28, 2000.

John G. Spooner, "Tiny tubes mean big chip advances," Cnet News.com, Tech News First, Apr. 26, 2001.

Jeong-Mi Moon et al., "High-Yield Purification Process of Singlewalled Carbon Nanotubes," J. Phys. Chem. B 2001, 105, pp. 5677-5681.

"A New Class of Nanostructure: Semiconducting Nanobelts Offer Potential for Nanosensors and Nanoelectronics," Mar. 12, 2001, http://www.sciencedaily.com/releases/2001/03/010309080953.htm.

Hermanson et al., "Dielectrophoretic Assembly of Electrically Functional Microwires from Nanoparticle Suspensions," Materials Science, vol. 294, No. 5544, Issue of Nov. 2, 2001, pp. 1082-1086.

Press Release, "Toshiba Demonstrates Operation of Single-Electron Transistor Circuit at Room Temperature," Toshiba, Jan. 10, 2001.

J. Appenzeller et al., "Optimized contact configuration for the study of transport phenomena in ropes of single-wall carbon nanotubes," Applied Physics Letters, vol. 78, No. 21, pp. 3313-3315, May 21, 2001.

David Rotman, "Molecular Memory, Replacing silicon with organic molecules could mean tiny supercomputers," Technology Review, May 2001, p. 46.

Westervelt et al., "Molecular Electronics," NSF Functional Nanostructures Grant 9871810, NSF Partnership in Nanotechnology Conference, Jan. 29-30, 2001; http://www.unix.oit.umass.edu/~nano/NewFiles/FN19_Harvard.pdf.

Niyogi et al., "Chromatographic Purification of Soluble Single-Walled Carbon Nanotubes (s-SWNTs)," J. Am. Chem. Soc 2001, 123, pp. 733-734.

Duan et al., "Indium phosphide nanowires as building blocks for nanoscale electronic and optoelectronic devices," Nature, vol. 409, Jan. 4, 2001, pp. 66-69.

Paulson, et al., "Tunable Resistance of a Carbon Nanotube-Graphite Interface," Science, vol. 290, Dec. 1, 2000, pp. 1742-1744.

Wei et al., "Reliability and current carrying capacity of carbon nanotubes," Applied Physics Letters, vol. 79, No. 8, Aug. 20, 2001, pp. 1172-1174.

Collins et al., "Nanotubes for Electronics," Scientific American, Dec. 2000, pp. 62-69.

Avouris et al., "Carbon nanotubes: nanomechanics, manipulation, and electronic devices," Applied Surface Science 141 (1999), pp. 201-209.

Smith et al., "Electric-field assisted assembly and alignment of metallic nanowires," Applied Physics Letters, vol. 77, No. 9, Aug. 28, 2000, pp. 1399-1401.

Hone et al., "Electrical and thermal transport properties of magnetically aligned single wall carbon nanotube films," Applied Physics Letters, vol. 77, No. 5, Jul. 31, 2000, pp. 666-668.

Smith et al., "Structural anisotropy of magnetically aligned single wall carbon nanotube films," Applied Physics Letters, vol. 77, No. 5, Jul. 31, 2000, pp. 663-665.

Andriotis et al., "Various bonding configurations of transition-metal atoms on carbon nanotubes: Their effect on contact resistance," Applied Physics Letters, vol. 76, No. 26, Jun. 26, 2000, pp. 3890-3892.

Chen et al., "Aligning single-wall carbon nanotubes with an alternating-current electric field," Applied Physics Letters, vol. 78, No. 23, Jun. 4, 2001, pp. 3714-3716.

Bezryadin et al., "Self-assembled chains of graphitized carbon nanoparticles," Applied Physics Letters, vol. 74, No. 18, May 3, 1999, pp. 2699-2701.

Bezryadin et al., "Evolution of avalanche conducting states in electrorheological liquids," Physical Review E, vol. 59, No. 6, Jun. 1999, pp. 6896-6901.

Liu et al., "Fullerene Pipes," Science, vol. 280, May 22, 1998, pp. 1253-1255.

Yamamoto et al., "Orientation and purification of carbon nanotubes using ac electrophoresis," J. Phys. D: Appl. Phys 31 (1998) L34-L36.

Bandow et al., "Purification of Single-Wall Carbon Nanotubes by Microfiltration," J. Phys. Chem. B 1997, 101, pp. 8839-8842.

Tohji et al., "Purifying single walled nanotubes," Nature, vol. 383, Oct. 24, 1996, p. 679.

Dejan Rakovic, "Hierarchical Neural Networks and Brainwaves: Towards a Theory of Consciousness," Brain & Consciousness: Proc. ECPD Workshop (ECPD, Belgrade, 1997), pp. 189-204.

Dave Anderson & George McNeill, "Artificial Neural Networks Technology," A DACS (Data & Analysis Center for Software) State-of-the-Art Report, Contract No. F30602-89-C-0082, ELIN: A011, Rome Laboratory RL/C3C, Griffiss Air Force Base, New York, Aug. 20, 1992.

Greg Mitchell, "Sub-50 nm Device Fabrication Strategies," Project No. 890-00, Cornell Nanofabrication Facility, Electronics—p. 90-91, National Nanofabrication Users Network.

John-William DeClaris, "An Introduction to Neural Networks," http://www.ee.umd.edu/medlab/neural/nn1.html.

"Neural Networks," StatSoft, Inc., http://www.statsoftinc.com/textbook/stevnet.html.

Stephen Jones, "Neural Networks and the Computation Brain or Maters relating to Artificial Intelligence," The Brain Project, http://www.culture.com.au/brain_proj/neur_net.htm.

David W. Clark, "An Introduction to Neural Networks"; http://members.home.net/neuralnet/introtonn/index.htm.

"A Basic Introduction to Neural Networks"; http://blizzard.gis.uiuc.edu/htmldocs/Neural/neural.html.

Meyer et al., "Computational neural networks: a general purpose tool for nanotechnology," Abstract, $5^{th}$ Foresight Conference on Molecular Nanotechnology; http://www.foresight.org/Conferences/MNT05/Abstracts/Meyeabst.html.

Saito et al., "A 1M Synapse Self-Learning Digital Neural Network Chip," ISSCC, pp. 6.5-1 to 6.5-10, IEEE 1998.

Espejo, et al., "A 16×16 Cellular Neural Network Chip for Connected Component Detection," Jun. 30, 1999; http://www.imse.cnm.csic.es/Chipcat/espejo/chip-2.pdf.

Pati et al., "Neural Networks for Tactile Perception," Systems Research Center and Dept. of Electrical Engineering, University of Maryland and U.S Naval Research Laboratory. 1987; http://www.isr.umd.edu/TechReports/ISR/1987/TR_87-123/TR_87-123.phtml.

Osamu Fujita, "Statistical estimation of the number of hidden units for feedforward neural networks," Neural Networks 11 (1998), pp. 851-859.

Abraham Harte, "Liquid Crystals Allow Large-Scale Alignment of Carbon Nanotubes," CURJ (Caltech Undergraduate Research Journal), Nov. 2001, vol. 1, No. 2, pp. 44-49.

"Quantum-Dot Arrays for Computation," ORNL Review vol. 34, No. 2, 2001, pp. 1-5 http://www.ornlgov/ORNLReview/v34_2_01/arrays.htm.

"Elements of Artificial Neural Networks" K. Mehrotra, C. K. Mohan, S. Ranka, 1997, MIT Press, pp. 116-135.

"Collective Transport in Arrays of Small Metallic Dots" A. Alan Middleton, N.S. Wingreen, 1993, The American Physical Society, 0031-9007/93/71(19)/3198(4), pp. 3198 through 3201.

"Solid-State thin-film memistor for electronic neural networks", S. Thakoor, A. Moopenn, T. Daud, and A.P. Thakoor, Journal of Applied Physics—Mar. 15, 1990—vol. 67, Issue 6, pp. 3132-3135.

"Computational nanotechnology with carbon nanotubes and fullernes", Srivastave, D. Menon M. Kyeongjae Cho, NASA Ames Res. Center, Moffett Field, CA, Computing in Science & Engineering, Jul./Aug. 2001, vol. 3, Issue 4, pp. 42-55.

X. Liu, et al., "Electric-Field-Induced Accumulation and Alignment of Carbon Nanotubes," 2002 Annual Report Conference on Electrical Insulation and Dielectric Phenomena; 2002 IEEE, pp. 31-34.

O'Connor, P. et al., "CMOS Preamplifier with High Lincarity and Ultra Low Noise for X-Ray Spectroscopy," IEEE Transactions on Nuclear Science , Jun. 3, 1997, vol. 44, Issue 3, pp. 318-325.

"Nanoparticles Get Wire," Sciencenow, Aug. 28, 1997, Dimes Institute, Delft University of Technology.

Snow, E. S., et al., "Nanofabrication with Proximal Probes," Proceedings of the IEEE, Apr. 1997, vol. 85, No. 4, pp. 601-611.

Bezryadin, A. et al., "Trapping Single Particle with Nanoelectrodes," Physics News Graphics, Sep. 1997.

* cited by examiner

MULTILAYER TRAINING IN A PHYSICAL NEURAL NETWORK FORMED UTILIZING NANOTECHNOLOGY

CROSS-REFERENCE TO RELATED PATENT APPLICATIONS

This application is a continuation of U.S. patent application Ser. No. 10/748,546, which was filed on Dec. 30, 2003 now U.S. Pat. No. 7,392,230 and claims priority as a Continuation-In-Part of U.S. patent application Ser. No. 10/162,524 entitled "Multilayer Training in a Physical Neural Network Formed Utilizing Nanotechnology," which was filed on Jun. 5, 2002 now abandoned.

TECHNICAL FIELD

The present invention generally relates to nanotechnology. The present invention also relates to neural networks and neural computing systems and methods thereof. The present invention also relates to physical neural networks, which may be constructed based on nanotechnology. The present invention also related to VLSI (Very Large Scale Integrated) analog neural network chips. The present invention also relates to nanoconductors, such as nanotubes and nanowires. The present invention also relates to methods and systems for forming a neural network.

BACKGROUND OF THE INVENTION

Neural networks are computational systems that permit computers to essentially function in a manner analogous to that of the human brain. Neural networks do not utilize the traditional digital model of manipulating 0's and 1's. Instead, neural networks create connections between processing elements, which are equivalent to neurons of a human brain. Neural networks are thus based on various electronic circuits that are modeled on human nerve cells (i.e., neurons). Generally, a neural network is an information-processing network, which is inspired by the manner in which a human brain performs a particular task or function of interest. Computational or artificial neural networks are thus inspired by biological neural systems. The elementary building block of biological neural systems is of course the neuron, the modifiable connections between the neurons, and the topology of the network.

Biologically inspired artificial neural networks have opened up new possibilities to apply computation to areas that were previously thought to be the exclusive domain of human intelligence. Neural networks learn and remember in ways that resemble human processes. Areas that show the greatest promise for neural networks, such as pattern classification tasks such as speech and image recognition, are areas where conventional computers and data-processing systems have had the greatest difficulty.

In general, artificial neural networks are systems composed of many nonlinear computational elements operating in parallel and arranged in patterns reminiscent of biological neural nets. The computational elements, or nodes, are connected via variable weights that are typically adapted during use to improve performance. Thus, in solving a problem, neural net models can explore many competing hypothesis simultaneously using massively parallel nets composed of many computational elements connected by links with variable weights. In contrast, with conventional von Neumann computers, an algorithm must first be developed manually, and a program of instructions written and executed sequentially. In some applications, this has proved extremely difficult. This makes conventional computers unsuitable for many real-time problems. A description and examples of artificial neural networks are disclosed in the publication entitled "Artificial Neural Networks Technology," by Dave Anderson and George McNeill, Aug. 10, 1992, a DACS (Data & Analysis Center for Software) State-of-the-Art Report under Contract Number F30602-89-C-0082, Rome Laboratory RL/C3C, Griffiss Air Force Base, New York, which is herein incorporated by reference.

In a neural network, "neuron-like" nodes can output a signal based on the sum of their inputs, the output being the result of an activation function. In a neural network, there exists a plurality of connections, which are electrically coupled among a plurality of neurons. The connections serve as communication bridges among of a plurality of neurons coupled thereto. A network of such neuron-like nodes has the ability to process information in a variety of useful ways. By adjusting the connection values between neurons in a network, one can match certain inputs with desired outputs.

One does not program a neural network. Instead, one "teaches" a neural network by examples. Of course, there are many variations. For instance, some networks do not require examples and extract information directly from the input data. The two variations are thus called supervised and unsupervised learning. Neural networks are currently used in applications such as noise filtering, face and voice recognition and pattern recognition. Neural networks can thus be utilized as an advanced mathematical technique for processing information.

Neural networks that have been developed to date are largely software-based. A true neural network (e.g., the human brain) is massively parallel (and therefore very fast computationally) and very adaptable. For example, half of a human brain can suffer a lesion early in its development and not seriously affect its performance. Software simulations are slow because during the learning phase a standard computer must serially calculate connection strengths. When the networks get larger (and therefore more powerful and useful), the computational time becomes enormous. For example, networks with 10,000 connections can easily overwhelm a computer. In comparison, the human brain has about 100 billion neurons, each of which is connected to about 5,000 other neurons. On the other hand, if a network is trained to perform a specific task, perhaps taking many days or months to train, the final useful result can be etched onto a piece of silicon and also mass-produced.

A number of software simulations of neural networks have been developed. Because software simulations are performed on conventional sequential computers, however, they do not take advantage of the inherent parallelism of neural network architectures. Consequently, they are relatively slow. One frequently used measurement of the speed of a neural network processor is the number of interconnections it can perform per second. For example, the fastest software simulations available can perform up to about 18 million interconnects per second. Such speeds, however, currently require expensive super computers to achieve. Even so, 18 million interconnects per second is still too slow to perform many classes of pattern classification tasks in real time. These include radar target classifications, sonar target classification, automatic speaker identification, automatic speech recognition and electro-cardiogram analysis, etc.

The implementation of neural network systems has lagged somewhat behind their theoretical potential due to the difficulties in building neural network hardware. This is primarily because of the large numbers of neurons and weighted connections required. The emulation of even of the simplest biological nervous systems would require neurons and connections numbering in the millions. Due to the difficulties in building such highly interconnected processors, the currently available neural network hardware systems have not approached this level of complexity. Another disadvantage of hardware systems is that they typically are often custom designed and built to implement one particular neural network architecture and are not easily, if at all, reconfigurable to implement different architectures. A true physical neural network chip, for example, has not yet been designed and successfully implemented.

The problem with pure hardware implementation of a neural network with technology as it exists today, is the inability to physically form a great number of connections and neurons. On-chip learning can exist, but the size of the network would be limited by digital processing methods and associated electronic circuitry. One of the difficulties in creating true physical neural networks lies in the highly complex manner in which a physical neural network must be designed and built. The present inventor believes that solutions to creating a true physical and artificial neural network lies in the use of nanotechnology and the implementation of analog variable connections. The term "Nanotechnology" generally refers to nanometer-scale manufacturing processes, materials and devices, as associated with, for example, nanometer-scale lithography and nanometer-scale information storage. Nanometer-scale components find utility in a wide variety of fields, particularly in the fabrication of microelectrical and microelectromechanical systems (commonly referred to as "MEMS"). Microelectrical nano-sized components include transistors, resistors, capacitors and other nano-integrated circuit components. MEMS devices include, for example, micro-sensors, micro-actuators, micro-instruments, micro-optics, and the like.

In general, nanotechnology presents a solution to the problems faced in the rapid pace of computer chip design in recent years. According to Moore's law, the number of switches that can be produced on a computer chip has doubled every 18 months. Chips now can hold millions of transistors. However, it is becoming increasingly difficult to increase the number of elements on a chip using present technologies. At the present rate, in the next few years the theoretical limit of silicon based chips will be reached. Because the number of elements, which can be manufactured on a chip, determines the data storage and processing capabilities of microchips, new technologies are required which will allow for the development of higher performance chips.

Present chip technology is also limiting when wires need to be crossed on a chip. For the most part, the design of a computer chip is limited to two dimensions. Each time a circuit must cross another circuit, another layer must be added to the chip. This increases the cost and decreases the speed of the resulting chip. A number of alternatives to standard silicon based complementary metal oxide semiconductor ("CMOS") devices have been proposed. The common goal is to produce logic devices on a nanometer scale. Such dimensions are more commonly associated with molecules than integrated circuits.

Integrated circuits and electrical components thereof, which can be produced at a molecular and nanometer scale, include devices such as carbon nanotubes and nanowires, which essentially are nanoscale conductors ("nanoconductors"). Nanocondcutors are tiny conductive tubes (i.e., hollow) or wires (i.e., solid) with a very small size scale (e.g., 1.0-100 nanometers in diameter and hundreds of microns in length). Their structure and fabrication have been widely reported and are well known in the art. Carbon nanotubes, for example, exhibit a unique atomic arrangement, and possess useful physical properties such as one-dimensional electrical behavior, quantum conductance, and ballistic electron transport.

Carbon nanotubes are among the smallest dimensioned nanotube materials with a generally high aspect ratio and small diameter. High-quality single-walled carbon nanotubes can be grown as randomly oriented, needle-like or spaghetti-like tangled tubules. They can be grown by a number of fabrication methods, including chemical vapor deposition (CVD), laser ablation or electric arc growth. Carbon nanotubes can be grown on a substrate by catalytic decomposition of hydrocarbon containing precursors such as ethylene, methane, or benzene. Nucleation layers, such as thin coatings of Ni, Co, or Fe are often intentionally added onto the substrate surface in order to nucleate a multiplicity of isolated nanotubes. Carbon nanotubes can also be nucleated and grown on a substrate without a metal nucleating layer by using a precursor including one or more of these metal atoms. Semiconductor nanowires can be grown on substrates by similar processes.

Attempts have been made to construct electronic devices utilizing nano-sized electrical devices and components. For example, a molecular wire crossbar memory is disclosed in U.S. Pat. No. 6,128,214 entitled "Molecular Wire Crossbar Memory" dated Oct. 3, 2000 to Kuekes et al. Kuekes et al disclose a memory device that is constructed from crossbar arrays of nanowires sandwiching molecules that act as on/off switches. The device is formed from a plurality of nanometer-scale devices, each device comprising a junction formed by a pair of crossed wires where one wire crosses another and at least one connector species connects the pair of crossed wires in the junction. The connector species comprises a bi-stable molecular switch. The junction forms either a resistor or a diode or an asymmetric non-linear resistor. The junction has a state that is capable of being altered by application of a first voltage and sensed by the application of a second, non-destructive voltage. A series of related patents attempts to cover everything from molecular logic to how to chemically assemble these devices.

Such a molecular crossbar device has two general applications. The notion of transistors built from nanotubes and relying on nanotube properties is being pursued. Second, two wires can be selectively brought to a certain voltage and the resulting electrostatic force attracts them. When they touch, the Van der Walls force keeps them in contact with each other and a "bit" is stored. The connections in this apparatus can therefore be utilized for a standard (i.e., binary and serial) computer. The inventors of such a device thus desire to coax a nanoconductor into a binary storage media or a transistor. As it turns out, such a device is easier to utilize as a storage device.

The molecular wire crossbar memory device disclosed in Kuekes et al and related patents thereof simply comprise a digital storage medium that functions at a nano-sized level. Such a device, however, is not well-suited for non-linear and analog functions. Neural networks are non-linear in nature and naturally analog. A neural network is a very non-linear system, in that small changes to its input can create large changes in its output. To date, nanotechnology has not been applied to the creation of truly physical neural networks.

Based on the foregoing, the present inventor believes that a physical neural network, which incorporates nanotechnology, is a solution to the problems encountered by prior art neural network solutions. In particular, the present inventor believes that a true physical neural network can be designed and constructed without relying on computer simulations for training, or relying on standard digital (binary) memory to store connections strengths. The present inventor additionally believes that a need exists for a technique, including methods and systems thereof, for training a physical neural network formed utilizing nanotechnology, particularly for physical neural networks having multiple layers therein.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is, therefore, one aspect of the present invention to provide a physical neural network.

It is therefore another aspect of the present to provide a physical neural network, which can be formed and implemented utilizing nanotechnology.

It is still another aspect of the present invention to provide a physical neural network, which can be formed from a plurality of interconnected nanoconnections or nanoconnectors.

It is a further aspect of the present invention to provide neuron like nodes, which can be formed and implemented utilizing nanotechnology;

It is also an aspect of the present invention to provide a physical neural network that can be formed from one or more neuron-like nodes.

It is yet a further aspect of the present invention to provide a physical neural network, which can be formed from a plurality of nanoconductors, such as, for example, nanowires and/or nanotubes.

It is still an additional aspect of the present invention to provide a physical neural network, which can be implemented physically in the form of a chip structure.

It is another aspect of the present invention to provide methods and systems for the training of multiple connection networks located between neuron layers within one or more multi-layer physical neural networks thereof.

The above and other aspects can be achieved as is now described. Methods and systems for training at least one connection network located between neuron layers within a multi-layer physical neural network. A multi-layer physical neural network can be formed having a plurality of inputs and a plurality outputs thereof. The multi-layer physical neural network comprises a plurality of layers therein. Each layer thereof comprises at least one connection network and at least one associated neuron. (Note that such a layer can also be referred to as a "neuron layer"). Thereafter, a training wave, as further described herein, can be initiated across one or more connection networks associated with an initial layer of the multi-layer physical neural network which propagates thereafter through succeeding connection networks of succeeding layers of the multi-layer physical neural network by successively closing and opening at least one switch associated with each layer of the multi-layer physical neural network. At least one feedback signal thereof can be automatically provided to each preceding connection network associated with each preceding layer thereof to strengthen or weaken nanoconnections associated with each connection network of the multi-layer physical neural network.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 3 illustrates a block diagram illustrating a network of nanoconnections formed between two electrodes, in accordance with a preferred embodiment of the present invention;

DETAILED DESCRIPTION OF THE INVENTION

The particular values and configurations discussed in these non-limiting examples can be varied and are cited merely to illustrate an embodiment of the present invention and are not intended to limit the scope of the invention.

The physical neural network described and disclosed herein is different from prior art forms of neural networks in that the disclosed physical neural network does not require a computer simulation for training, nor is its architecture based on any current neural network hardware device. The design of the physical neural network of the present invention is actually quite "organic". The physical neural network described herein is generally fast and adaptable, no matter how large such a physical neural network becomes. The physical neural network described herein can be referred to generically as a Knowm. The terms "physical neural network" and "Knowm" can be utilized interchangeably to refer to the same device, network, or structure.

Network orders of magnitude larger than current VSLI neural networks can be built and trained with a standard computer. One consideration for a Knowm is that it must be large enough for its inherent parallelism to shine through. Because the connection strengths of such a physical neural network are dependant on the physical movement of nanoconnections thereof, the rate at which a small network can learn is generally very small and a comparable network simulation on a standard computer can be very fast. On the other hand, as the size of the network increases, the time to train the device does not change. Thus, even if the network takes a full second to change a connection value a small amount, if it does the same to a billion connections simultaneously, then its parallel nature begins to express itself.

A physical neural network (i.e., a Knowm) must have two components to function properly. First, the physical neural network must have one or more neuron-like nodes that sum a signal and output a signal based on the amount of input signal received. Such a neuron-like node is generally non-linear in its output. In other words, there should be a certain threshold for input signals, below which nothing is output and above which a constant or nearly constant output is generated or allowed to pass. This is a very basic requirement of standard software-based neural networks, and can be accomplished by an activation function. The second requirement of a physical neural network is the inclusion of a connection network composed of a plurality of interconnected connections (i.e., nanoconnections). Such a connection network is described in greater detail herein.

Figure 1:
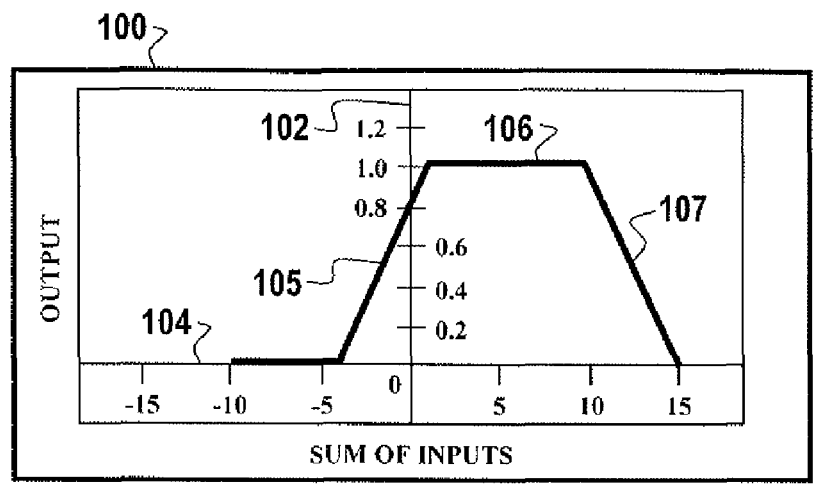
FIG. 1 illustrates a graph illustrating a typical activation function that can be implemented in accordance with the physical neural network of the present invention.

FIG. 1 illustrates a graph 100 illustrating a typical activation function that can be implemented in accordance with the physical neural network of the present invention. Note that the activation function need not be non-linear, although non-linearity is generally desired for learning complicated input-output relationships. The activation function depicted in FIG. 1 comprises a linear function, and is shown as such for general edification and illustrative purposes only. As explained previously, an activation function may also be non-linear.

As illustrated in FIG. 1, graph 100 includes a horizontal axis 104 representing a sum of inputs, and a vertical axis 102 representing output values. A graphical line 106 indicates threshold values along a range of inputs from approximately −10 to +10 and a range of output values from approximately 0 to 1. As more neural networks (i.e., active inputs) are established, the overall output as indicated at line 105 climbs until the saturation level indicated by line 106 is attained. If a connection is not utilized, then the level of output (i.e., connection strength) begins to fade until it is revived. This phenomenon is analogous to short term memory loss of a human brain. Note that graph 100 is presented for generally illustrative and edification purposes only and is not considered a limiting feature of the present invention.

Figure 2:
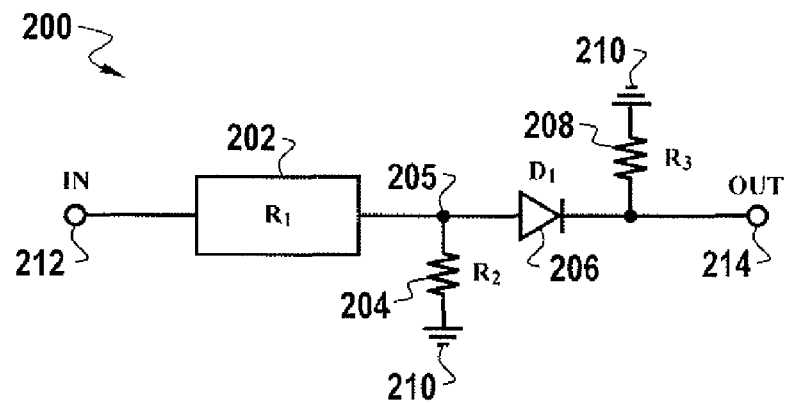
FIG. 2 depicts a schematic diagram illustrating a diode configuration as a neuron, in accordance with a preferred embodiment of the present invention.

In a Knowm, the neuron-like node can be configured as a standard diode-based circuit, the diode being the most basic semiconductor electrical component, and the signal it sums may be a voltage. An example of such an arrangement of circuitry is illustrated in FIG. 2, which generally depicts a schematic diagram illustrating a diode-based configuration as a neuron 200, in accordance with a preferred embodiment of the present invention. Those skilled in the art can appreciate that the use of such a diode-based configuration is not considered a limiting feature of the present invention, but merely represents one potential arrangement in which the present invention may be implemented.

Although a diode may not necessarily be utilized, its current versus voltage characteristics are non-linear when used with associated resistors and similar to the relationship depicted in FIG. 1. The use of a diode as a neuron is thus not a limiting feature of the present invention, but is only referenced herein with respect to a preferred embodiment. The use of a diode and associated resistors with respect to a preferred embodiment simply represents one potential "neuron" implementation. Such a configuration can be said to comprise an artificial neuron. It is anticipated that other devices and components may be utilized instead of a diode to construct a physical neural network and a neuron-like node (i.e., artificial neuron), as indicated here.

Thus, neuron 200 comprises a neuron-like node that may include a diode 206, which is labeled $D_1$, and a resistor 204, which is labeled $R_2$. Resistor 204 is connected to a ground 210 and an input 205 of diode 206. Additionally, a resistor 202, which is represented as a block and labeled $R_1$ can be connected to input 205 of diode 206. Block 202 includes an input 212, which comprises an input to neuron 200. A resistor 208, which is labeled $R_3$, is also connected to an output 214 of diode 206. Additionally, resistor 208 is coupled to ground 210. Diode 206 in a physical neural network is analogous to a neuron of a human brain, while an associated connection formed thereof, as explained in greater detail herein, is analogous to a synapse of a human brain.

As depicted in FIG. 2, the output 214 is determined by the connection strength of $R_1$ (i.e., resistor 202). If the strength of $R_1$'s connection increases (i.e., the resistance decreases), then the output voltage at output 214 also increases. Because diode 206 conducts essentially no current until its threshold voltage (e.g., approximately 0.6V for silicon) is attained, the output voltage will remain at zero until $R_1$ conducts enough current to raise the pre-diode voltage to approximately 0.6V. After 0.6V has been achieved, the output voltage at output 214 will increase linearly. Simply adding extra diodes in series or utilizing different diode types may increase the threshold voltage.

An amplifier may also replace diode 206 so that the output voltage immediately saturates at a reference threshold voltage, thus resembling a step function, until a threshold value and a constant value above the threshold is attained. $R_3$ (i.e., resistor 208) functions generally as a bias for diode 206 (i.e., $D_1$) and should generally be about 10 times larger than resistor 204 (i.e., $R_2$). In the circuit configuration illustrated in FIG. 2, $R_1$ can actually be configured as a network of connections composed of many inter-connected conducting nanowires (i.e., see FIG. 3). As explained previously, such connections are analogous to the synapses of a human brain.

Figure 3:
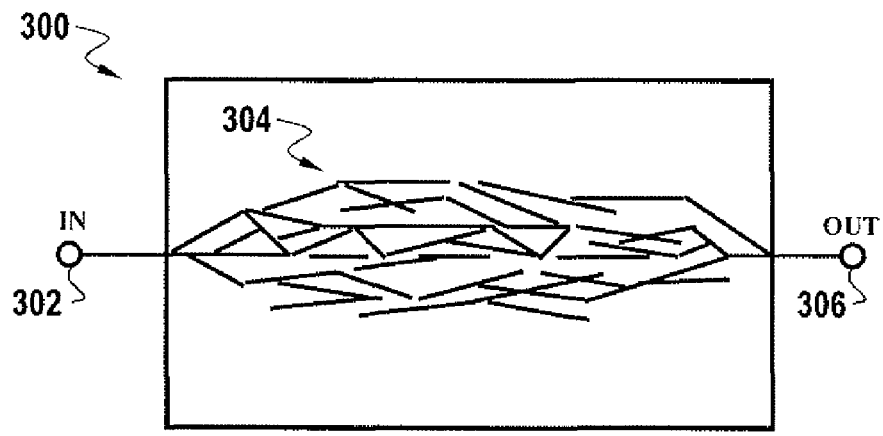
FIG. 3 illustrates a block diagram illustrating a network of nanowires between two electrodes, in accordance with a preferred embodiment of the present invention.

FIG. 3 illustrates a block diagram illustrating a network of nanoconnections 304 formed between two electrodes, in accordance with a preferred embodiment of the present invention. Nanoconnections 304 (e.g., nanoconductors) depicted in FIG. 3 are generally located between input 302 and output 306. The network of nanoconnections depicted in FIG. 3 can be implemented as a network of nanoconductors. Examples of nanoconductors include devices such as, for example, nanowires, nanotubes, and nanoparticles. Nanoconnections 304, which are analogous to the synapses of a human brain, should be composed of electrical conducting material (i.e., nanoconductors). It should be appreciated by those skilled in the art that such nanoconductors can be provided in a variety of shapes and sizes without departing from the teachings herein.

For example, carbon particles (e.g., granules or bearings) may be used for developing nanoconnections. The nanoconductors utilized to form a connection network may be formed as a plurality of nanoparticles. For example, each nanoconnection within a connection network may be formed from a chain of carbon nanoparticles. In "Self-assembled chains of graphitized carbon nanoparticles" by Bezryadin et al., Applied Physics Letters, Vol. 74, No. 18, pp. 2699-2701, May 3, 1999, which is incorporated herein by reference, a technique is reported, which permits the self-assembly of conducting nanoparticles into long continuous chains. The authors suggest that new approaches be developed in order to organize such nanoparticles into usefully electronic devices. Thus, nanoconductors which are utilized to form a physical neural network (i.e., Knowm) could be formed from such nanoparticles.

It should be appreciated by those skilled in the art that the Bezyadin et al reference does not, of course, comprise limiting features of the present invention, nor does it teach, suggest nor anticipate a physical neural network. Rather, such a reference merely demonstrate recent advances in the carbon nanotechnology arts and how such advances may be adapted for use in association with the Knowm-based system described herein. It can be further appreciated that a connection network as disclosed herein may be composed from a variety of different types of nanoconductors. For example, a connection network may be formed from a plurality of nanoconductors, including nanowires, nanotubes and/or nanoparticles. Note that such nanowires, nanotubes and/or nanoparticles, along with other types of nanoconductors can be formed from materials such as carbon or silicon. For example, carbon nanotubes may comprise a type of nanotube that can be utilized in accordance with the present invention.

As illustrated in FIG. 3, nanoconnections 304 comprise a plurality of interconnected nanoconnections, which from this point forward, can be referred to generally as a "connection network." An individual nanoconnection may constitute a nanoconductor such as, for example, a nanowire, a nanotube, nanoparticles(s), or any other nanoconducting structures. Nanoconnections 304 may comprise a plurality of interconnected nanotubes and/or a plurality of interconnected nanowires. Similarly, nanoconnections 304 may be formed from a plurality of interconnected nanoparticles. A connection network is thus not one connection between two electrodes, but a plurality of connections between inputs and outputs. Nanotubes, nanowires, nanoparticles and/or other nanoconducting structures may be utilized, of course, to construct nanoconnections 304 between input 302 and input 306. Although a single input 302 and a single input 306 is depicted in FIG. 3, it can be appreciated that a plurality of inputs and a plurality of outputs may be implemented in accordance with the present invention, rather than simply a single input 302 or a single output 306.

Figure 4:
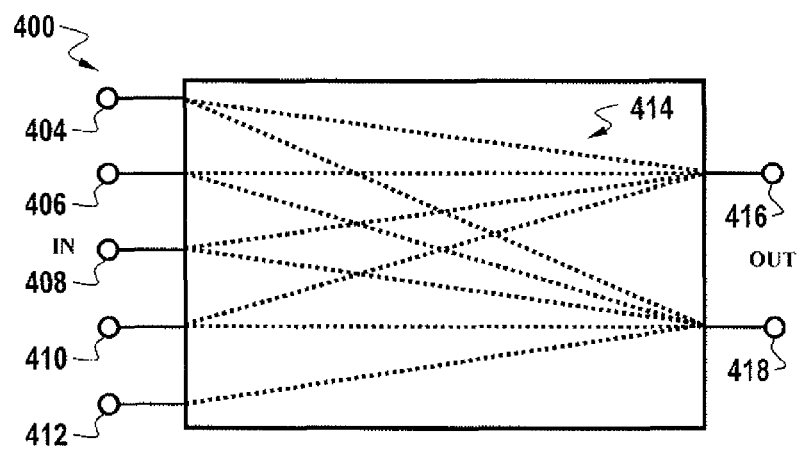
FIG. 4 depicts a block diagram illustrating a plurality of connections between inputs and outputs of a physical neural network, in accordance with a preferred embodiment of the present invention.

FIG. 4 depicts a block diagram illustrating a plurality of connections 414 between inputs 404, 406, 408, 410, 412 and outputs 416 and 418 of a physical neural network, in accordance with a preferred embodiment of the present invention. Inputs 404, 406, 408, 410, and 412 provide input signals to connections 414. Output signals are then generated from connections 414 via outputs 416 and 418. A connection network can thus be configured from the plurality of connections 414. Such a connection network is generally associated with one or more neuron-like nodes.

The connection network also comprises a plurality of interconnected nanoconnections, wherein each nanoconnection thereof is strengthened or weakened according to an application of an electric field. A connection network is not possible if built in one layer because the presence of one connection can alter the electric field so that other connections between adjacent electrodes could not be formed. Instead, such a connection network can be built in layers, so that each connection thereof can be formed without being influenced by field disturbances resulting from other connections. This can be seen in FIG. 5.

Figure 5:
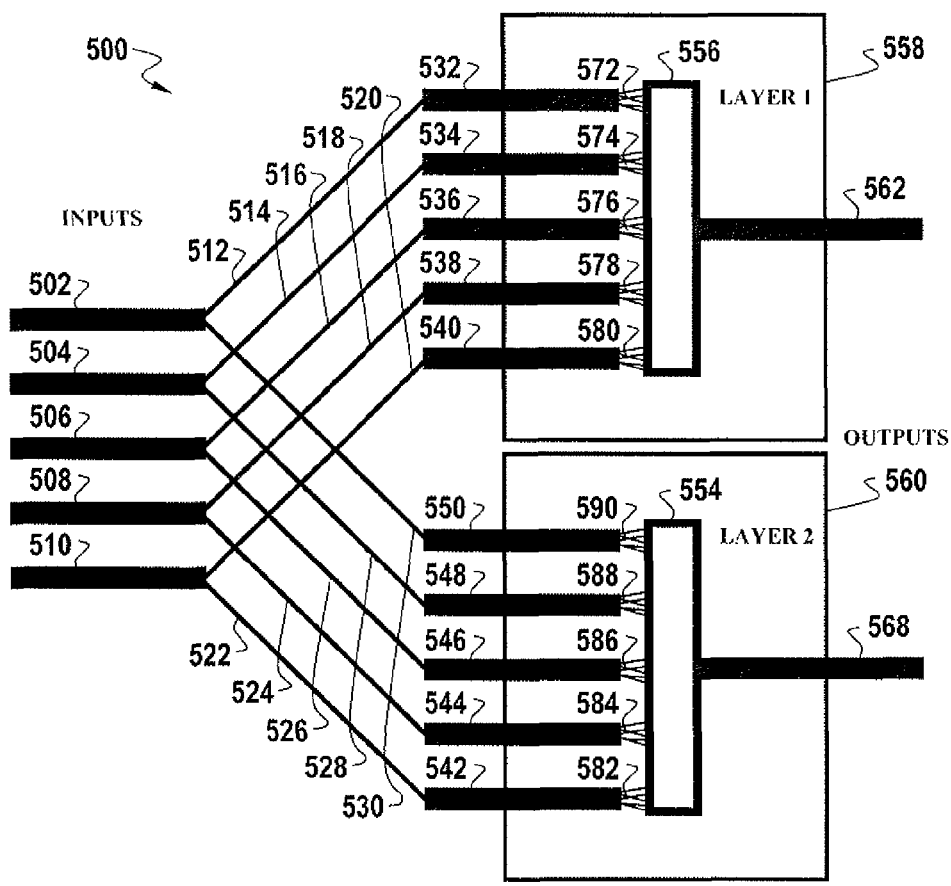
FIG. 5 illustrates a schematic diagram of a physical neural network that can be created without disturbances, in accordance with a preferred embodiment of the present invention.

FIG. 5 illustrates a schematic diagram of a physical neural network 500 that can be created without disturbances, in accordance with a preferred embodiment of the present invention. Physical neural network 500 is composed of a first layer 558 and a second layer 560. A plurality of inputs 502, 504, 506, 508, and 510 are respectively provided to layers 558 and 560 respectively via a plurality of input lines 512, 514, 516, 518, and 520 and a plurality of input lines 522, 524, 526, 528, and 530. Input lines 512, 514, 516, 518, and 520 are further coupled to input lines 532, 534, 536, 538, and 540 such that each line 532, 534, 536, 538, and 540 is respectively coupled to nanoconnections 572, 574, 576, 578, and 580. Thus, input line 532 is connected to nanconnections 572. Input line 534 is connected to nanoconnections 574, and input line 536 is connected to nanoconnections 576. Similarly, input line 538 is connected to nanconnections 578, and input line 540 is connected to nanoconnections 580.

Nanoconnections 572, 574, 576, 578, and 580 may comprise nanoconductors such as, for example, nanotubes and/or nanowires. Nanoconnections 572, 574, 576, 578, and 580 thus comprise one or more nanoconductors. Additionally, input lines 522, 524, 526, 528, and 530 are respectively coupled to a plurality of input lines 542, 544, 546, 548 and 550, which are in turn each respectively coupled to nanoconnections 582, 584, 586, 588, and 590. Thus, for example, input line 542 is connected to nanoconnections 582, while input line 544 is connected to nanoconnections 584. Similarly, input line 546 is connected to nanoconnections 586 and input line 548 is connected to nanoconnections 588. Additionally, input line 550 is connected to nanconnections 590. Box 556 and 554 generally represent simply the output and are thus illustrated connected to outputs 562 and 568. In other words, outputs 556 and 554 respectively comprise outputs 562 and 568. The aforementioned input lines and associated components thereof actually comprise physical electronic components, including conducting input and output lines and physical nanoconnections, such as nanotubes and/or nanowires.

Thus, the number of layers 558 and 560 equals the number of desired outputs 562 and 568 from physical neural network 500. In the previous two figures, every input was potentially connected to every output, but many other configurations are possible. The connection network can be made of any electrically conducting material, although the physics of it requires that they be very small so that they will align with a practical voltage. Carbon nanotubes or any conductive nanowire can be implemented in accordance with the physical neural network described herein.

Such components can thus form connections between electrodes by the presence of an electric field. For example, the orientation and purification of carbon nanotubes has been demonstrated using ac electrophoresis in isopropyl alcohol, as indicated in "Orientation and purification of carbon nanotubes using ac electrophoresis" by Yamamoto et al., J. Phys. D: Applied Physics, 31 (1998), L34-36, which is incorporated herein by reference. Additionally, an electric-field assisted assembly technique used to position individual nanowires suspended in an electric medium between two electrodes defined lithographically on an SiO2 substrate is indicated in "Electric-field assisted assembly and alignment of metallic nanowires," by Smith et al., Applied Physics Letters, Vol. 77, Num. 9, August 28, 200, and is also herein incorporated by reference.

Additionally, it has been reported that it is possible to fabricate deterministic wiring networks from single-walled carbon nanotubes (SWNTs) as indicated in "Self-Assembled, Deterministic Carbon Nanotube Wiring Networks" by Diehl, et al. in Angew. Chem. Int. Ed. 2002, 41. No. 2, which is also herein incorporated by reference. In addition, the publication "Indium phosphide nanowires as building blocks for nanoscale electronic and optoelectronic devices" by Duan, et al., Nature, Vol. 409, Jan. 4, 2001, which is incorporated herein by reference, reports that an electric-field-directed assembly can be used to create highly integrated device arrays from nanowire building blocks. It should be appreciated by those skilled in the art these references do not comprise limiting features of the present invention, nor do such references teach or anticipate a physical neural network. Rather, such references are incorporated herein by reference to demonstrate recent advances in the carbon nanotechnology arts and how such advances may be adapted for use in association with the physical neural network described herein.

The only general requirements for the conducting material utilized to configure the nanoconductors are that such conducting material must conduct electricity, and a dipole should preferably be induced in the material when in the presence of an electric field. Alternatively, the nanoconductors utilized in association with the physical neural network described herein can be configured to include a permanent dipole that is produced by a chemical means, rather than a dipole that is induced by an electric field Therefore, it should be appreciated by those skilled in the art that a connection network could also be comprised of other conductive particles that may be developed or found useful in the nanotechnology arts. For example, carbon particles (or "dust") may also be used as nanoconductors in place of nanowires or nanotubes. Such particles may include bearings or granule-like particles.

A connection network can be constructed as follows: A voltage is applied across a gap that is filled with a mixture of nanowires and a "solvent". This mixture could be made of many things. The only requirements are that the conducting wires must be suspended in the solvent, either dissolved or in some sort of suspension, free to move around; the electrical conductance of the substance must be less than the electrical conductance of the suspended conducting wire; and the viscosity of the substance should not be too much so that the conducting wire cannot move when an electric field is applied.

The goal for such a connection network is to develop a network of connections of just the right values so as to satisfy the particular signal-processing requirement—exactly what a neural network does. Such a connection network can be constructed by applying a voltage across a space occupied by the mixture mentioned. To create the connection network, the input terminals are selectively raised to a positive voltage while the output terminals are selectively grounded. Thus, connections can gradually form between the inputs and outputs. The important requirement that makes the physical neural network of the present invention functional as a neural network is that the longer this electric field is applied across a connection gap, or the greater the frequency or amplitude, the more nanotubes and/or nanowires and/or particles align and the stronger the connection thereof becomes. Thus, the connections that are utilized most frequently by the physical neural network become the strongest.

The connections can either be initially formed and have random resistances or no connections may be formed at all. By initially forming random connections, it might be possible to teach the desired relationships faster, because the base connections do not have to be built up from scratch. Depending on the rate of connection decay, having initial random connections could prove faster, although not necessarily. The connection network can adapt itself to the requirements of a given situation regardless of the initial state of the connections. Either initial condition will work, as connections that are not used will "dissolve" back into solution. The resistance of the connection can be maintained or lowered by selective activations of the connection. In other words, if the connection is not used, it will fade away, analogous to the connections between neurons in a human brain. The temperature of the solution can also be maintained at a particular value so that the rate that connections fade away can be controlled. Additionally an electric field can be applied perpendicular to the connections to weaken them, or even erase them out altogether (i.e., as in clear, zero, or reformatting of a "disk").

The nanoconnections may or may not be arranged in an orderly array pattern. The nanoconnections (e.g., nanotubes, nanowires, etc) of a physical neural network do not have to order themselves into neatly formed arrays. They simply float in the solution, or lie at the bottom of the gap, and more or less line up in the presence an electric field. Precise patterns are thus not necessary. In fact, neat and precise patterns may not be desired. Rather, due to the non-linear nature of neural networks, precise patterns could be a drawback rather than an advantage. In fact, it may be desirable that the connections themselves function as poor conductors, so that variable connections are formed thereof, overcoming simply an "on" and "off" structure, which is commonly associated with binary and serial networks and structures thereof.

Figure 6:
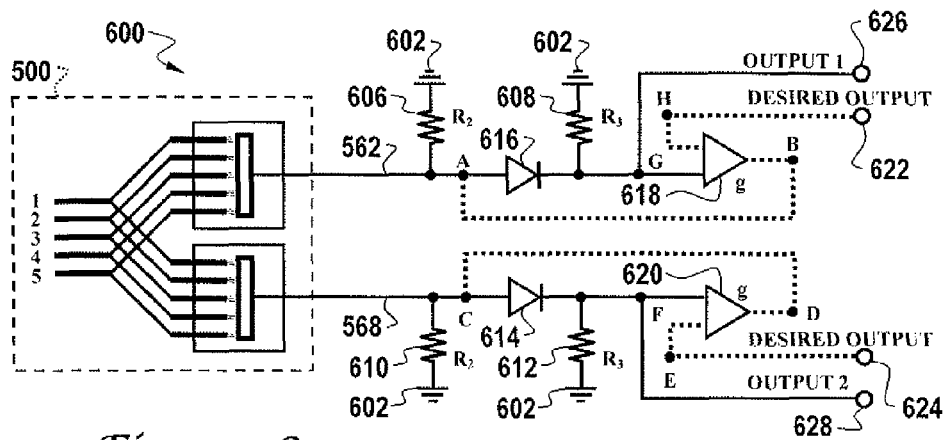
FIG. 6 depicts a schematic diagram illustrating an example of a physical neural network that can be implemented in accordance with an alternative embodiment of the present invention.

FIG. 6 depicts a schematic diagram illustrating an example of a physical neural network 600 that can be implemented in accordance an alternative embodiment of the present invention. Note that in FIGS. 5 and 6, like parts are indicated by like reference numerals. Thus, physical neural network 600 can be configured, based on physical neural network 500 illustrated in FIG. 5. In FIG. 6, inputs 1, 2, 3, 4, and 5 are indicated, which are respectively analogous to inputs 502, 504, 506, 508, and 510 illustrated in FIG. 5. Outputs 562 and 568 are provided to a plurality of electrical components to create a first output 626 (i.e., Output 1) and a second output 628 (i.e., Output 2). Output 562 is tied to a resistor 606, which is labeled R2 and a diode 616 at node A. Output 568 is tied to a resistor 610, which is also labeled R2 and a diode 614 at node C. Resistors 606 and 610 are each tied to a ground 602.

Diode 616 is further coupled to a resistor 608, which is labeled R3, and first output 626. Additionally, resistor 608 is coupled to ground 602 and an input to an amplifier 618. An output from amplifier 618, as indicated at node B and dashed lines thereof, can be tied back to node A. A desired output 622 from amplifier 618 is coupled to amplifier 618 at node H. Diode 614 is coupled to a resistor 612 at node F. Note that resistor 612 is labeled R3. Node F is in turn coupled to an input of amplifier 620 and to second output 628 (i.e., Output 2). Diode 614 is also connected to second output 628 and an input to amplifier 620 at second output 628. Note that second output 628 is connected to the input to amplifier 620 at node F. An output from amplifier 620 is further coupled to node D, which in turn is connected to node C. A desired output 624, which is indicated by a dashed line in FIG. 6, is also coupled to an input of amplifier 620 at node E.

In FIG. 6, the training of physical neural network 600 can be accomplished utilizing, for example, op-amp devices (e.g., amplifiers 618 and 620). By comparing an output (e.g., first output 626) of physical neural network 600 with a desired output (e.g., desired output 622), the amplifier (e.g., amplifier 618) can provide feedback and selectively strengthen connections thereof. For instance, suppose it is desired to output a voltage of +V at first output 626 (i.e., Output 1) when inputs 1 and 4 are high. When inputs 1 and 4 are taken high, also assume that first output 626 is zero. Amplifier 618 can then compare the desired output (+V) with the actual output (0) and output −V. In this case, −V is equivalent to ground.

The op-amp outputs and grounds the pre-diode junction (i.e., see node A) and causes a greater electric field across inputs 1 and 4 and the layer 1 output. This increased electric field (larger voltage drop) can cause the nanoconductors in the solution between the electrode junctions to align themselves, aggregate, and form a stronger connection between the 1 and 4 electrodes. Feedback can continue to be applied until output of physical neural network 600 matches the desired output. The same procedure can be applied to every output.

In accordance with the aforementioned example, assume that Output 1 was higher than the desired output (i.e., desired output 622). If this were the case, the op-amp output can be +V and the connection between inputs 1 and 4 and layer one output can be raised to +V. Columbic repulsions between the nanoconductors can force the connection apart, thereby weakening the connection. The feedback will then continue until the desired output is obtained. This is just one training mechanism. One can see that the training mechanism does not require any computations, because it is a simple feedback mechanism.

Such a training mechanism, however, may be implemented in many different forms. Basically, the connections in a connection network must be able to change in accordance with the feedback provided. In other words, the very general notion of connections being strengthened or connections being weakened in a physical system is the essence of a physical neural network (i.e., Knowm). Thus, it can be appreciated that the training of such a physical neural network may not require a "CPU" to calculate connection values thereof. The Knowm can adapt itself. Complicated neural network solutions could be implemented very rapidly "on the fly", much like a human brain adapts as it performs.

The physical neural network disclosed herein thus has a number of broad applications. The core concept of a Knowm, however, is basic. The very basic idea that the connection values between electrode junctions by nanoconductors can be used in a neural network devise is all that required to develop an enormous number of possible configurations and applications thereof.

Another important feature of a physical neural network is the ability to form negative connections. This is an important feature that makes possible inhibitory effects useful in data processing. The basic idea is that the presence of one input can inhibit the effect of another input. In artificial neural networks as they currently exist, this is accomplished by multiplying the input by a negative connection value. Unfortunately, with a physical device, the connection may only take on zero or positive values under such a scenario.

In other words, either there can be a connection or no connection. A connection can simulate a negative connection by dedicating a particular connection to be negative, but one connection cannot begin positive and through a learning process change to a negative connection. In general, if starts positive, it can only go to zero. In essence, it is the idea of possessing a negative connection initially that results in the simulation, because this does not occur in a brain. Only one type of signal travels through axons/dendrites in a human brain. That signal is transferred into the flow of a neurotransmitter whose effect on the postsynaptic neuron can be either excitatory or inhibitory, depending on the neuron, thereby dedicating certain connections inhibitory and excitatory One method for solving this problem is to utilize two sets of connections for the same output, having one set represent the positive connections and the other set represent the negative connections. The output of these two layers can be compared, and the layer with the greater output will output either a high signal or a low signal, depending on the type of connection set (inhibitory or excitatory). This can be seen in FIG. 7.

Figure 7:
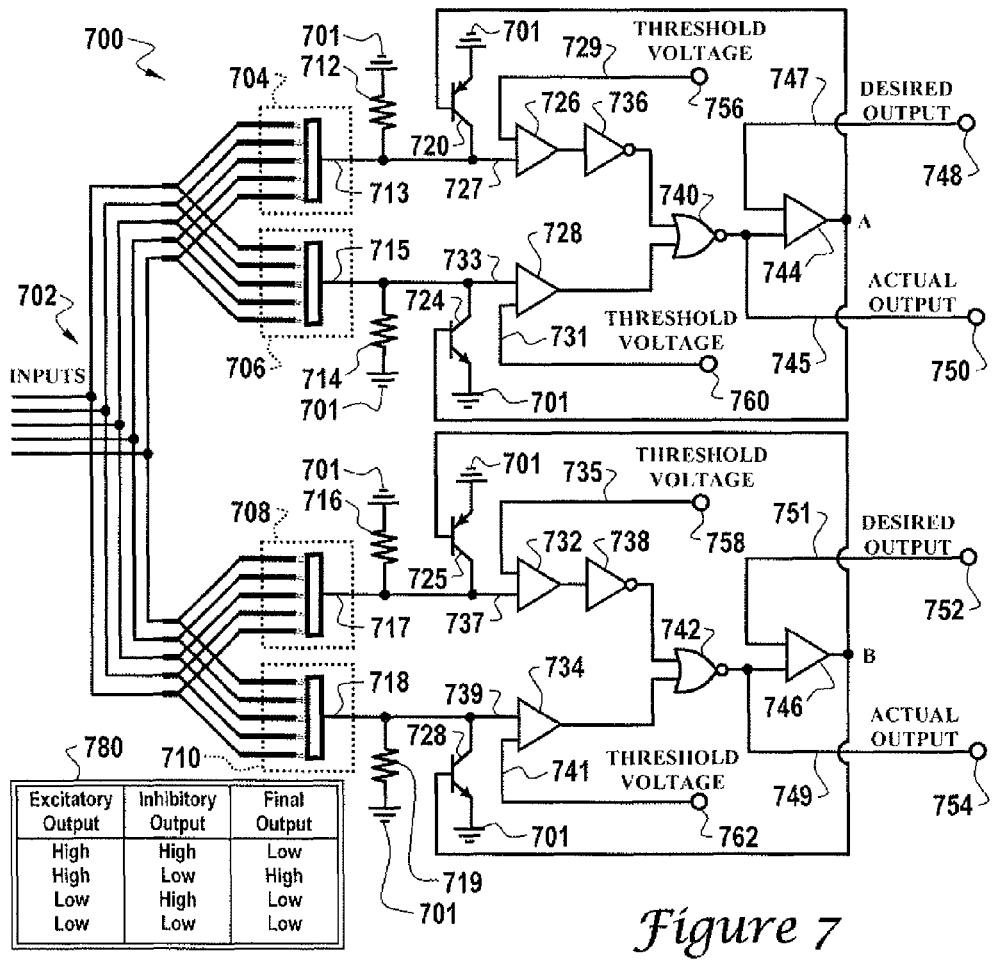
FIG. 7 illustrates a schematic diagram illustrating an example of a physical neural network that can be implemented in accordance with an alternative embodiment of the present invention.

FIG. 7 illustrates a schematic diagram illustrating an example of a physical neural network 700 that can be implemented in accordance with an alternative embodiment of the present invention. Physical neural network 700 thus comprises a plurality of inputs 702 (not necessarily binary) which are respectively fed to layers 704, 706, 708, and 710. Each layer is analogous to the layers depicted earlier, such as for example layers 558 and 560 of FIG. 5. An output 713 of layer 704 can be connected to a resistor 712, a transistor 720 and a first input 727 of amplifier 726. Transistor 720 is generally coupled between ground 701 and first input 727 of amplifier 726. Resistor 712 is connected to a ground 701. Note that ground 701 is analogous to ground 602 illustrated in FIG. 6 and ground 210 depicted in FIG. 2. A second input 729 of amplifier 726 can be connected to a threshold voltage 756. The output of amplifier 726 can in turn be fed to an inverting amplifier 736.

The output of inverting amplifier 736 can then be input to a NOR device 740. Similarly, an output 716 of layer 706 may be connected to resistor 714, transistor 733 and a first input 733 of an amplifier 728. A threshold voltage 760 is connected to a second input 737 of amplifier 728. Resistor 714 is generally coupled between ground 701 and first input 733 of amplifier 728. Note that first input 733 of amplifier 728 is also generally connected to an output 715 of layer 706. The output of amplifier 728 can in turn be provided to NOR device 740. The output from NOR device 740 is generally connected to a first input 745 of an amplifier 744. An actual output 750 can be taken from first input 745 to amplifier 744. A desired output 748 can be taken from a second input 747 to amplifier 744. The output from amplifier 744 is generally provided at node A, which in turn is connected to the input to transistor 720 and the input to transistor 724. Note that transistor 724 is generally coupled between ground 701 and first input 733 of amplifier 728. The second input 731 of amplifier 728 can produce a threshold voltage 760.

Layer 708 provides an output 717 that can be connected to resistor 716, transistor 725 and a first input 737 to an amplifier 732. Resistor 716 is generally coupled between ground 701 and the output 717 of layer 708. The first input 737 of amplifier 732 is also electrically connected to the output 717 of layer 708. A second input 735 to amplifier 732 may be tied to a threshold voltage 758. The output from amplifier 732 can in turn be fed to an inverting amplifier 738. The output from inverting amplifier 738 may in turn be provided to a NOR device 742. Similarly, an output 718 from layer 710 can be connected to a resistor 719, a transistor 728 and a first input 739 of an amplifier 734. Note that resistor 719 is generally coupled between node 701 and the output 719 of layer 710. A second input 741 of amplifier 734 may be coupled to a threshold voltage 762. The output from of NOR device 742 is generally connected to a first input 749 of an amplifier 746. A desired output 752 can be taken from a second input 751 of amplifier 746. An actual output 754 can be taken from first input 749 of amplifier 746. The output of amplifier 746 may be provided at node B, which in turn can be tied back to the respective inputs to transistors 725 and 728. Note that transistor 725 is generally coupled between ground 701 and the first input 737 of amplifier 732. Similarly, transistor 728 is generally connected between ground 701 and the first input 739 of amplifier 734.

Note that transistors 720, 724, 725 and/or 728 each can essentially function as a switch to ground. A transistor such as, for example, transistor 720, 724, 725 and/or 728 may comprise a field-effect transistor (FET) or another type of transistor, such as, for example, a single-electron transistor (SET). Single-electron transistor (SET) circuits are essential for hybrid circuits combining quantum SET devices with conventional electronic devices. Thus, SET devices and circuits may be adapted for use with the physical neural network of the present invention. This is particularly important because as circuit design rules begin to move into regions of the sub-100 nanometer scale, where circuit paths are only 0.001 of the thickness of a human hair, prior art device technologies will begin to fail, and current leakage in traditional transistors will become a problem. SET offers a solution at the quantum level, through the precise control of a small number of individual electrons.

Transistors such as transistors 720, 724, 725 and/or 728 can also be implemented as carbon nanotube transistors. An example of a carbon nanotube transistor is disclosed in U.S. Patent Application No. 2001/0023986A1 to Macevski, which is dated Sep. 27, 2001 and is entitled, "System and Method for Fabricating Logic Devices Comprising Carbon Nanotube Transistors." U.S. Patent Application No. 2001/0023986A1 to Macevski is herein incorporated by reference. U.S. Patent Application No. 2001/0023986A1 does not teach or claim a physical neural network, but instead teaches the formation of a discrete carbon nanotube transistor. Thus, U.S. Patent Application No. 2001/0023986A1 is not considered a limiting feature of the present invention but is instead referenced herein to illustrate the use of a particular type of discrete transistor in the nanodomain.

A truth table for the output of circuit 700 is illustrated at block 780 in FIG. 7. As indicated at block 780, when an excitatory output is high and the inhibitory output is also high, the final output is low. When the excitatory output is high and the inhibitory output is low, the final output is high. Similarly, when the excitatory output is low and the inhibitory output is high, the final output is low. When the excitatory output is low and the inhibitory output is also low, the final output is low. Note that layers 704 and 708 may thus comprise excitatory connections, while layers 706 and 710 may comprise inhibitory connections.

For every desired output, two sets of connections are used. The output of a two-diode neuron can be fed into an op-amp (comparator). If the output that the op-amp receives is low when it should be high, the op-amp outputs a low signal. This low signal can cause the transistors (e.g., transistors 720 and 725) to saturate and ground out the pre-diode junction for the excitatory diode. This causes, like before, an increase in the voltage drop across those connections that need to increase their strength. Note that only those connections going to the excitatory diode are strengthened. Likewise, if the desired output were low when the actual output was high, the op-amp can output a high signal. This can cause the inhibitory transistor (e.g., an NPN transistor) to saturate and ground out the neuron junction of the inhibitory connections. Those connections going to the inhibitory diode can thereafter strengthen.

At all times during the learning process, a weak alternating electric field can be applied perpendicular to the connections. This can cause the connections to weaken by rotating the nanotube perpendicular to the connection direction. This perpendicular field is important because it can allow for a much higher degree of adaptation. To understand this, one must realize that the connections cannot (practically) keep getting stronger and stronger. By weakening those connections not contributing much to the desired output, we decrease the necessary strength of the needed connections and allow for more flexibility in continuous training. This perpendicular alternating voltage can be realized by the addition of two electrodes on the outer extremity of the connection set, such as plates sandwiching the connections (i.e., above and below). Other mechanisms, such as increasing the temperature of the nanotube suspension could also be used for such a purpose, although this method is perhaps a little less controllable or practical.

The circuit depicted in FIG. 7 can be separated into two separate circuits. The first part of the circuit can be composed of nanotube connections, while the second part of the circuit comprises the "neurons" and the learning mechanism (i.e., op-amps/comparator). The learning mechanism on first glance appears similar to a relatively standard circuit that could be implemented on silicon with current technology. Such a silicon implementation can thus comprise the "neuron" chip. The second part of the circuit (i.e., the connections) is thus a new type of chip, although it could be constructed with current technology. The connection chip can be composed of an orderly array of electrodes spaced anywhere from, for example, 100 nm to 1 μm or perhaps even further. In a biological system, one talks of synapses connecting neurons. It is in the synapses where the information is processed, (i.e., the "connection weights"). Similarly, such a chip can contain all of the synapses for the physical neural network. A possible arrangement thereof can be seen in FIG. 8.

Figure 8:
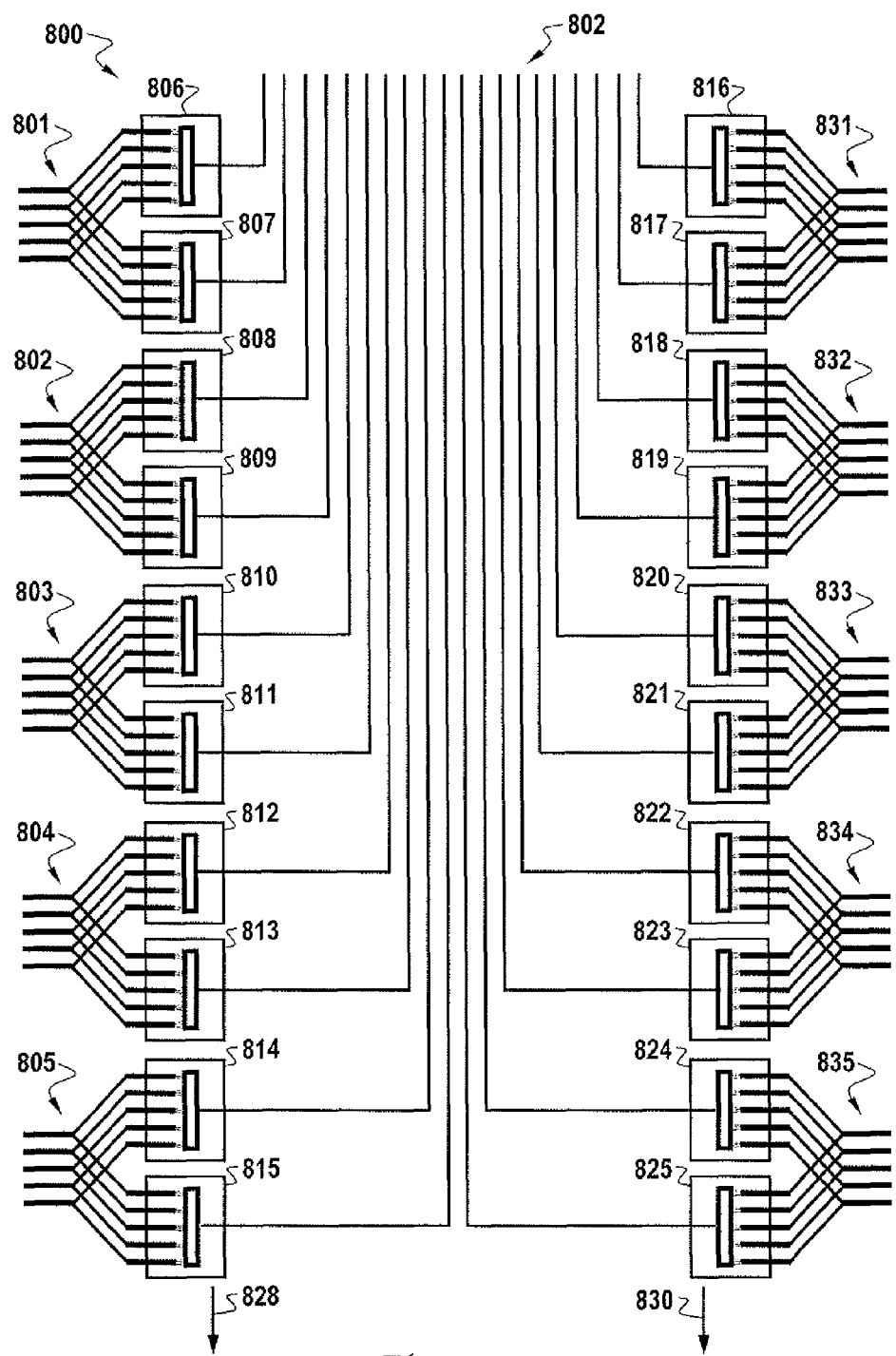
FIG. 8 depicts a schematic diagram of a chip layout for a connection network that may be implemented in accordance with an alternative embodiment of the present invention.

FIG. 8 depicts a schematic diagram of a chip layout 800 for a connection network that may be implemented in accordance with an alternative embodiment of the present invention. FIG. 8 thus illustrates a possible chip layout for a connection chip (e.g., connection network 800) that can be implemented in accordance with the present invention. Chip layout 800 includes an input array composed of plurality of inputs 801, 802, 803, 804, and 805, which are provided to a plurality of layers 806, 807, 808, 809, 810, 811, 812, 813, 814, and 815. A plurality of outputs 802 can be derived from layers 806, 807, 808, 809, 810, 811, 812, 813, 814, and 815. Thus inputs 801 are coupled to layers 806 and 807, while inputs 802 are connected to layers 808 and 809. Similarly, inputs 803 are connected to layers 810 and 811. Also, inputs 804 are connected to layers 812 and 813. Inputs 805 are connected to layers 814 and 815.

Similarly, such an input array can includes a plurality of inputs 831, 832, 833, 834 and 835 which are respectively input to a plurality of layers 816, 817, 818, 819, 820, 821, 822, 823, 824 and 825. Thus, inputs 831 are connected to layers 816 and 817, while inputs 832 are coupled to layers 818 and 819. Additionally, inputs 833 are connected to layers 820 and 821. Inputs 834 are connected to layers 822 and 823. Finally, inputs 835 are connected to layers 824 and 825. Arrows 828 and 830 represent a continuation of the aforementioned connection network pattern. Those skilled in the art can appreciate, of course, that chip layout 800 is not intended to represent an exhaustive chip layout or to limit the scope of the invention. Many modifications and variations to chip layout 800 are possible in light of the teachings herein without departing from the scope of the present invention. It is contemplated that the use of a chip layout, such as chip layout 800, can involve a variety of components having different characteristics.

Preliminary calculations based on a maximum etching capability of 200 nm resolution indicated that over 4 million synapses could fit on an area of approximately 1 cm$^2$. The smallest width that an electrode can possess is generally based on current lithography. Such a width may of course change as the lithographic arts advance. This value is actually about 70 nm for state-of-the-art techniques currently. These calculations are of course extremely conservative, and are not considered a limiting feature of the present invention. Such calculations are based on an electrode with, separation, and gap of approximately 200 nm. For such a calculation, 166 connection networks comprising 250 inputs and 100 outputs can fit within a one square centimeter area.

If such chips are stacked vertically, an untold number of synapses could be attained. This is two to three orders of magnitude greater than some of the most capable neural network chips out there today, chips that rely on standard methods to calculate synapse weights. Of course, the geometry of the chip could take on many different forms, and it is quite possible (based on a conservative lithography and chip layout) that many more synapses could fit in the same space. The training of a chip this size would take a fraction of the time of a comparably sized traditional chip using digital technology.

The training of such a trip is primarily based on two assumptions. First, the inherent parallelism of a physical neural network (i.e., a Knowm) can permit all training sessions to occur simultaneously, no matter now large the associated connection network. Second, recent research has indicated that near perfect aligning of nanotubes can be accomplished in approximately 15 minutes. If one considers that the input data, arranged as a vector of binary "high's" and "low's" is presented to the Knowm simultaneously, and that all training vectors are presented one after the other in rapid succession (e.g., perhaps 100 MHz or more), then each connection would "see" a different frequency in direct proportion to the amount of time that its connection is required for accurate data processing (i.e., provided by a feedback mechanism). Thus, if it only takes approximately 15 minutes to attain an almost perfect state of alignment, then this amount of time would comprise the longest amount of time required to train, assuming that all of the training vectors are presented during that particular time period.

Figure 9:
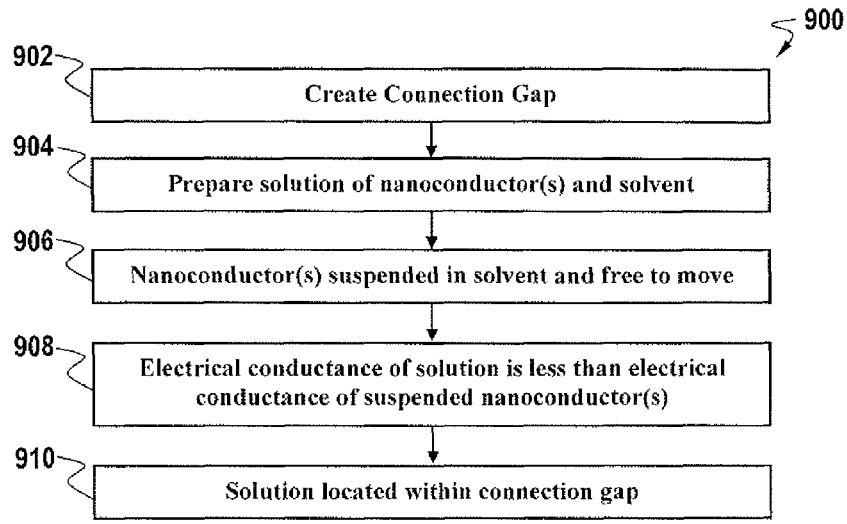
FIG. 9 illustrates a flow chart of operations illustrating operational steps that may be followed to construct a connection network, in accordance with a preferred embodiment of the present invention.

FIG. 9 illustrates a flow chart 900 of operations illustrating operational steps that may be followed to construct a connection network, in accordance with a preferred embodiment of the present invention. Initially, as indicated at block 902, a connection gap is created from a connection network structures. As indicated earlier, the goal for such a connection network is generally to develop a network of connections of "just" the right values to satisfy particular information processing requirements, which is precisely what a neural network accomplishes. As illustrated at block 904, a solution is prepared, which is composed of nanoconductors and a "solvent." Note that the term "solvent" as utilized herein has a variable meaning, which includes the traditional meaning of a "solvent," and also a suspension.

The solvent utilized can comprise a volatile liquid that can be confined or sealed and not exposed to air. For example, the solvent and the nanoconductors present within the resulting solution may be sandwiched between wafers of silicon or other materials. If the fluid has a melting point that is approximately at room temperature, then the viscosity of the fluid could be controlled easily. Thus, if it is desired to lock the connection values into a particular state, the associated physical neural network (i.e., Knowm) may be cooled slightly until the fluid freezes. The term "solvent" as utilized herein thus can include fluids such as for example, toluene, hexadecane, mineral oil, liquid crystals, etc.

Note that the solution in which the nanoconductors (i.e., nanoconnections) are present should generally comprise a dielectric solvent. Thus, when the resistance between the electrodes is measured, the conductivity of the nanoconductors is essentially measured, not that of the solvent. The nanoconductors can be suspended in the solution or can alternately lie on the bottom surface of the connection gap. Note that the solvent described herein may also comprise liquid crystal media. It has been found that carbon nanotube alignment is possible by dissolving nanotubes in liquid crystal media, such that liquid crystals thereof align with an electric field and take the nanotubes and/or other nanoconductors with them (i.e., see "Liquid Crystals Allow Large-Scale Alignment of Carbon Nanotubes," by Abraham Harte, CURJ, November, 2001, Vol. 1, No. 2, pp. 44-49, which is incorporated herein by reference). Alternatively, the solvent may also be provided in the form of a gas.

As illustrated thereafter at block 906, the nanoconductors must be suspended in the solvent, either dissolved or in a suspension of sorts, but generally free to move around, either in the solution or on the bottom surface of the gap. As depicted next at block 908, the electrical conductance of the solution must be less than the electrical conductance of the suspended nanoconductor(s).

Next, as illustrated at block 910, the viscosity of the substance should not be too much so that the nanoconductors cannot move when an electric field (e.g., voltage) is applied. Finally, as depicted at block 912, the resulting solution of the "solvent" and the nanoconductors is thus located within the connection gap.

Note that although a logical series of steps is illustrated in FIG. 9, it can be appreciated that the particular flow of steps can be re-arranged. Thus, for example, the creation of the connection gap, as indicated at block 902, may occur after the preparation of the solution of the solvent and nanoconductor(s), as indicated at block 904. FIG. 9 thus represents merely possible series of steps, which may be followed to create a connection network. It is anticipated that a variety of other steps may be followed as long as the goal of achieving a connection network in accordance with the present invention is achieved. Similar reasoning also applies to FIG. 10.

Figure 10:
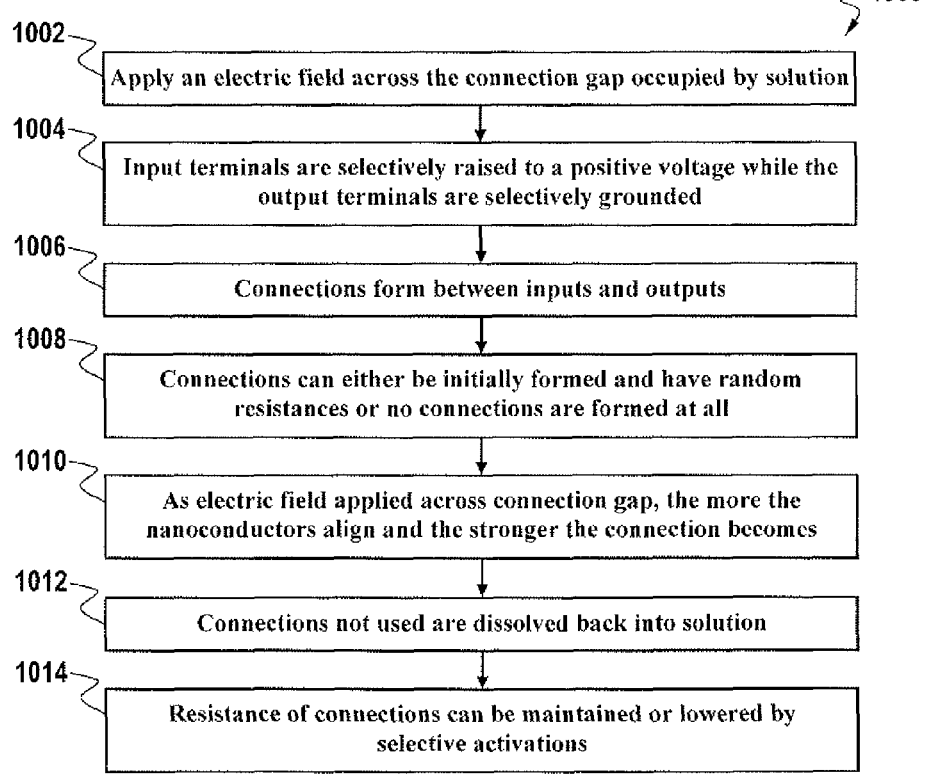
FIG. 10 depicts a flow chart of operations illustrating operational steps that may be utilized to strengthen nanoconductors within a connection gap, in accordance with a preferred embodiment of the present invention.

FIG. 10 depicts a flow chart 1000 of operations illustrating operational steps that may be utilized to strengthen nanoconductors within a connection gap, in accordance with a preferred embodiment of the present invention. As indicated at block 1002, an electric field can be applied across the connection gap discussed above with respect to FIG. 9. The connection gap can be occupied by the solution discussed above. As indicated thereafter at block 1004, to create the connection network, the input terminals can be selectively raised to a positive voltage while the output terminals are selectively grounded. As illustrated thereafter at block 1006, connections thus form between the inputs and the outputs. The important requirements that make the resulting physical neural network functional as a neural network is that the longer this electric field is applied across the connection gap, or the greater the frequency or amplitude, the more nanoconductors align and the stronger the connection becomes. Thus, the connections that get utilized the most frequently become the strongest.

As indicated at block 1008, the connections can either be initially formed and have random resistances or no connections will be formed at all. By forming initial random connections, it might be possible to teach the desired relationships faster, because the base connections do not have to be built up as much. Depending on the rate of connection decay, having initial random connections could prove to be a faster method, although not necessarily. A connection network will adapt itself to whatever is required regardless of the initial state of the connections. Thus, as indicated at block 1010, as the electric field is applied across the connection gap, the more the nonconductor(s) will align and the stronger the connection becomes. Connections (i.e., synapses) that are not used are dissolved back into the solution, as illustrated at block 1012. As illustrated at block 1014, the resistance of the connection can be maintained or lowered by selective activations of the connections. In other words, "if you do not use the connection, it will fade away," much like the connections between neurons in a human brain.

The neurons in a human brain, although seemingly simple when viewed individually, interact in a complicated network that computes with both space and time. The most basic picture of a neuron, which is usually implemented in technology, is a summing device that adds up a signal. Actually, this statement can be made even more general by stating that a neuron adds up a signal in discrete units of time. In other words, every group of signals incident upon the neuron can be viewed as occurring in one moment in time. Summation thus occurs in a spatial manner. The only difference between one signal and another signal depends on where such signals originate. Unfortunately, this type of data processing excludes a large range of dynamic, varying situations that cannot necessarily be broken up into discrete units of time.

The example of speech recognition is a case in point. Speech occurs in the time domain. A word is understood as the temporal pronunciation of various syllables. A sentence is composed of the temporal separation of varying words. Thoughts are composed of the temporal separation of varying sentences. Thus, for an individual to understand a spoken language at all, a syllable, word, sentence or thought must exert some type of influence on another syllable, word, sentence or thought. The most natural way that one sentence can exert any influence on another sentence, in the light of neural networks, is by a form of temporal summation. That is, a neuron "remembers" the signals it received in the past.

The human brain accomplishes this feat in an almost trivial manner. When a signal reaches a neuron, the neuron has an influx of ions rush through its membrane. The influx of ions contributes to an overall increase in the electrical potential of the neuron. Activation is achieved when the potential inside the cell reaches a certain threshold. The one caveat is that it takes time for the cell to pump out the ions, something that it does at a more or less constant rate. So, if another signal arrives before the neuron has time to pump out all of the ions, the second signal will add with the remnants of the first signal and achieve a raised potential greater than that which could have occurred with only the second signal. The first signal influences the second signal, which results in temporal summation.

Implementing this in a technological manner has proved difficult in the past. Any simulation would have to include a "memory" for the neuron. In a digital representation, this requires data to be stored for every neuron, and this memory would have to be accessed continually. In a computer simulation, one must discritize the incoming data, since operations (such as summations and learning) occur serially. That is, a computer can only do one thing at a time. Transformations of a signal from the time domain into the spatial domain require that time be broken up into discrete lengths, something that is not necessarily possible with real-time analog signals in which no point exists within a time-varying signal that is uninfluenced by another point.

A physical neural network, however, is generally not digital. A physical neural network is a massively parallel analog device. The fact that actual molecules (e.g., nanoconductors) must move around (in time) makes temporal summation a natural occurrence. This temporal summation is built into the nanoconnections. The easiest way to understand this is to view the multiplicity of nanoconnections as one connection with one input into a neuron-like node (Op-amp, Comparator, etc.). This can be seen in FIG. 11.

Figure 11:
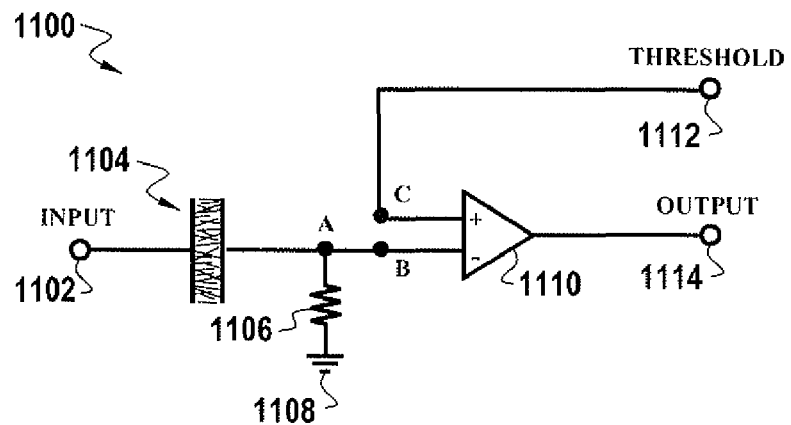
FIG. 11 illustrates a schematic diagram of a circuit illustrating temporal summation within a neuron, in accordance with a preferred embodiment of the present invention.

FIG. 11 illustrates a schematic diagram of a circuit 1100 illustrating temporal summation within a neuron, in accordance with a preferred embodiment of the present invention. As indicated in FIG. 11, an input 1102 is provided to nanoconnections 1104, which in turn provide a signal, which is input to an amplifier 1110 (e.g., op amp) at node B. A resistor 1106 is connected to node A, which in turn is electrically equivalent to node B. Node B is connected to a negative input of amplifier 1100. Resistor 1108 is also connected to a ground 1108. Amplifier 1110 provides output 1114. Note that although nanoconnections 1104 is referred to in the plural it can be appreciated that nanoconnections 1104 can comprise a single nanoconnection or a plurality of nanoconnections. For simplicity sake, however, the plural form is used to refer to nanoconnections 1104.

Input 1102 can be provided by another physical neural network (i.e., Knowm) to cause increased connection strength of nanoconnections 1104 over time. This input would most likely arrive in pulses, but could also be continuous. A constant or pulsed electric field perpendicular to the connections would serve to constantly erode the connections, so that only signals of a desired length or amplitude could cause a connection to form. Once the connection is formed, the voltage divider formed by nanoconnection 1104 and resistor 1106 can cause a voltage at node A in direct proportion to the strength of nanoconnections 1104. When the voltage at node A reaches a desired threshold, the amplifier (i.e., an op-amp and/or comparator), will output a high voltage (i.e., output 1114). The key to the temporal summation is that, just like a real neuron, it takes time for the electric field to breakdown the nanoconnections 1104, so that signals arriving close in time will contribute to the firing of the neuron (i.e., op-amp, comparator, etc.). Temporal summation has thus been achieved. The parameters of the temporal summation could be adjusted by the amplitude and frequency of the input signals and the perpendicular electric field.

Figure 12:
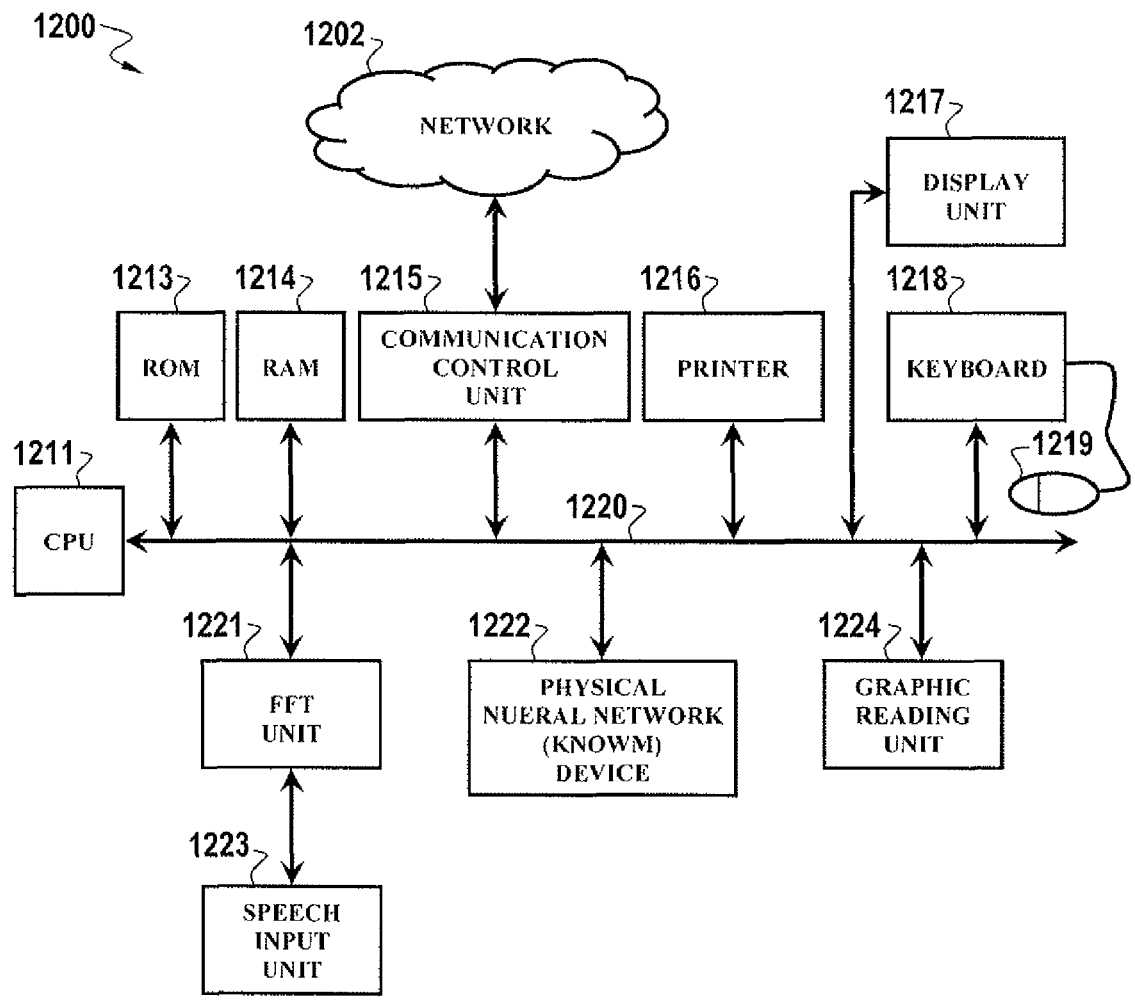
FIG. 12 depicts a block diagram illustrating a pattern recognition system, which may be implemented with a physical neural network device, in accordance with an alternative embodiment of the present invention.

FIG. 12 depicts a block diagram illustrating a pattern recognition system 1200, which may be implemented with a physical neural network device 1222, in accordance with an alternative embodiment of the present invention. Note that pattern recognition system 1200 can be implemented as a speech recognition system. Those skilled in the art can appreciate, however, that although pattern recognition system 1200 is depicted herein in the context of speech recognition, a physical neural network device (i.e., a Knowm device) may be implemented with other pattern recognition systems, such as visual and/or imaging recognition systems. FIG. 12 thus does not comprise a limiting feature of the present invention and is presented for general edification and illustrative purposes only. Those skilled in the art can appreciate that the diagram depicted in FIG. 12 may be modified as new applications and hardware are developed. The development or use of a pattern recognition system such as pattern recognition system 1200 of FIG. 12 by no means limits the scope of the physical neural network (i.e., Knowm) disclosed herein.

FIG. 12 thus illustrates in block diagram fashion, the system structure of a speech recognition device using a neural network according to an alternative embodiment of the present invention. The pattern recognition system 1200 is provided with a CPU 1211 for performing the functions of inputting vector rows and instructor signals (vector rows) to an output layer for the learning process of a physical neural network device 1222, and changing connection weights between respective neuron devices based on the learning process. Pattern recognition system 1200 can be implemented within the context of a data-processing system, such as, for example, a personal computer or personal digital assistant (PDA), both of which are well known in the art.

The CPU 1211 can perform various processing and controlling functions, such as pattern recognition, including but not limited to speech and/or visual recognition based on the output signals from the physical neural network device 1222. The CPU 1211 is connected to a read-only memory (ROM) 1213, a random-access memory (RAM) 1214, a communication control unit 1215, a printer 1216, a display unit 1217, a keyboard 1218, an FFT (fast Fourier transform) unit 1221, a physical neural network device 1222 and a graphic reading unit 1224 through a bus line 1220 such as a data bus line. The bus line 1220 may comprise, for example, an ISA, EISA, or PCI bus.

The ROM 1213 is a read-only memory storing various programs or data used by the CPU 1211 for performing processing or controlling the learning process, and speech recognition of the physical neural network device 1222. The ROM 1213 may store programs for carrying out the learning process according to error back-propagation for the physical neural network device or code rows concerning, for example, 80 kinds of phonemes for performing speech recognition. The code rows concerning the phonemes can be utilized as second instructor signals and for recognizing phonemes from output signals of the neuron device network. Also, the ROM 1213 can store programs of a transformation system for recognizing speech from recognized phonemes and transforming the recognized speech into a writing (i.e., written form) represented by characters.

A predetermined program stored in the ROM 1213 can be downloaded and stored in the RAM 1214. RAM 1214 generally functions as a random access memory used as a working memory of the CPU 1211. In the RAM 1214, a vector row storing area can be provided for temporarily storing a power obtained at each point in time for each frequency of the speech signal analyzed by the FFT unit 1221. A value of the power for each frequency serves as a vector row input to a first input portion of the physical neural network device 1222. Further, in the case where characters or graphics are recognized in the physical neural network device, the image data read by the graphic reading unit 1224 are stored in the RAM 1214.

The communication control unit 1215 transmits and/or receives various data such as recognized speech data to and/or from another communication control unit through a communication network 1202 such as a telephone line network, an ISDN line, a LAN, or a personal computer communication network. Network 1202 may also comprise, for example, a telecommunications network, such as a wireless communications network. Communication hardware methods and systems thereof are well known in the art.

The printer 1216 can be provided with a laser printer, a bubble-type printer, a dot matrix printer, or the like, and prints contents of input data or the recognized speech. The display unit 1217 includes an image display portion such as a CRT display or a liquid crystal display, and a display control portion. The display unit 1217 can display the contents of the input data or the recognized speech as well as a direction of an operation required for speech recognition utilizing a graphical user interface (GUI).

The keyboard 1218 generally functions as an input unit for varying operating parameters or inputting setting conditions of the FFT unit 1221, or for inputting sentences. The keyboard 1218 is generally provided with a ten-key numeric pad for inputting numerical figures, character keys for inputting characters, and function keys for performing various functions. A mouse 1219 can be connected to the keyboard 1218 and serves as a pointing device.

A speech input unit 1223, such as a microphone can be connected to the FFT unit 1221. The FFT unit 1221 transforms analog speech data input from the voice input unit 1223 into digital data and carries out spectral analysis of the digital data by discrete Fourier transformation. By performing a spectral analysis using the FFT unit 1221, the vector row based on the powers of the respective frequencies are output at predetermined intervals of time. The FFT unit 1221 performs an analysis of time-series vector rows, which represent characteristics of the inputted speech. The vector rows output by the FFT 1221 are stored in the vector row storing area in the RAM 1214. The graphic reading unit 224, provided with devices such as a CCD (Charged Coupled Device), can be used for reading images such as characters or graphics recorded on paper or the like. The image data read by the image-reading unit 1224 are stored in the RAM 1214. Note that an example of a pattern recognition apparatus, which may be modified for use with the physical neural network of the present invention, is disclosed in U.S. Pat. No. 6,026,358 to Tomabechi, Feb. 16, 2000, "Neural Network, A Method of Learning of a Neural Network and Phoneme Recognition Apparatus Utilizing a Neural Network." U.S. Pat. No. 6,026,358 is incorporated herein by reference.

The implications of a physical neural network are tremendous. With existing lithography technology, many electrodes in an array such as depicted in FIG. 5 can be etched onto a wafer of silicon. The "neurons" (i.e., op-amps, diodes, etc.), as well as the training circuitry illustrated in FIG. 6, could be built onto the same silicon wafer, although it may be desirable to have the connections on a separate chip due to the liquid solution of nanoconductors. A solution of suspended nanoconductors could be placed between the electrode connections and the chip could be packaged. The resulting "chip" would look much like a current Integrated Chip (IC) or VLSI (very large scale integrated) chips. One could also place a rather large network parallel with a computer processor as part of a larger system. Such a network, or group of networks, could add significant computational capabilities to standard computers and associated interfaces.

For example, such a chip may be constructed utilizing a standard computer processor in parallel with a large physical neural network or group of physical neural networks. A program can then be written such that the standard computer teaches the neural network to read, or create an association between words, which is precisely the same sort of task in which neural networks can be implemented. Once the physical neural network is able to read, it can be taught for example to "surf" the Internet and find material of any particular nature. A search engine can then be developed that does not search the Internet by "keywords", but instead by meaning. This idea of an intelligent search engine has already been proposed for standard neural networks, but until now has been impractical because the network required was too big for a standard computer to simulate. The use of a physical neural network (i.e., physical neural network) as disclosed herein now makes a truly intelligent search engine possible.

A physical neural network can be utilized in other applications, such as, for example, speech recognition and synthesis, visual and image identification, management of distributed systems, self-driving cars and filtering. Such applications have to some extent already been accomplished with standard neural networks, but are generally limited in expense, practicality and not very adaptable once implemented. The use of a physical neural network can permit such applications to become more powerful and adaptable. Indeed, anything that requires a bit more "intelligence" could incorporate a physical neural network. One of the primary advantages of a physical neural network is that such a device and applications thereof can be very inexpensive to manufacture, even with present technology. The lithographic techniques required for fabricating the electrodes and channels therebetween has already been perfected and implemented in industry.

Most problems in which a neural network solution is implemented are complex adaptive problems, which change in time. An example is weather prediction. The usefulness of a physical neural network is that it could handle the enormous network needed for such computations and adapt itself in real-time. An example wherein a physical neural network (i.e., Knowm) can be particularly useful is the Personal Digital Assistant (PDA). PDA's are well known in the art. A physical neural network applied to a PDA device can be advantageous because the physical neural network can ideally function with a large network that could constantly adapt itself to the individual user without devouring too much computational time from the PDA. A physical neural network could also be implemented in many industrial applications, such as developing a real-time systems control to the manufacture of various components. This systems control can be adaptable and totally tailored to the particular application, as necessarily it must.

The training of multiple connection networks between neuron layers within a multi-layer neural network is an important feature of any neural network. The addition of neuron layers to a neural network can increase the ability of the network to create increasingly complex associations between inputs and outputs. Unfortunately, the addition of extra neuron layers in a network raises an important question: How does one optimize the connections within the hidden layers to produce the desired output? The neural network field was stalled for some time trying to answer this question until several parties simultaneously stumbled onto a computationally efficient solution, now referred to generally as "back-propagation" or "back-prop" for short. As the name implies, the solution involves a propagation of error back from the output to the input. Essentially, back-propagation amounts to determining the minimum of an error surface composed of n variables, where the variable n represents the number of connections.

Unfortunately, this method requires that one take the derivative of the activation function of the neuron. Although this might not appear to be an extremely difficult requirement, it does begin to place limitations on the kind of activation functions allowed and by doing so, actually eliminates the activation function utilized by the neurons in a human brain via the step function. In other words, the neurons in a human brain fire if and only if the internal voltage is raised to a specific threshold. This type of function is not differentiable and therefore not allowed in the back-propagation algorithm.

Of course, one can approximate a step function to any arbitrary precision and still keep the function differentiable. One might then argue that the differentiable requirement does not limit the function of the training. But when one modifies the activation function so that it is very close to a step function, one finds that the teaching of the network is adversely affected. To understand why this is so, it should be realized that by simply taking the derivative of an activation function closely resembling a step-function, a very large positive number is expected to be attained at the threshold and zero (or very close to zero) almost everywhere else. This means that when a connection is updated, if the post-connection neuron is not at the activation threshold, either above or below, then the connection update is almost zero. Likewise, if the neuron is exactly at the threshold, then the update is huge.

Now imagine that initially almost all connections start off with low values, so that all neurons in all layers after the input layer are inactivated. This would then mean that the learning mechanism would take very long (if not forever) to update the connections to a point where there could activate post-input layer neurons. And once they did reach the activation threshold, then they could possibly overshoot it enough to saturate the neuron and leave us in another situation that takes forever to adjust. In other words, back propagation does not make much sense physically. Another related question to ask is do the neurons in a human brain take a derivative? Do they "know" the result of a connection on another neuron? In other words, how does a neuron know what the desired output is if each neuron is an independent summing machine, only concerned with its own activation level and firing only when that activation is above threshold? What exactly can a neuron "know" about its environment?

Although this question is certainly open for debate, it is plausible to state that a neuron can only "know" if it has fired and whether or not its own connections have caused the firing of other neurons. This is precisely the Hebb hypothesis for learning: "if neuron A repeatedly takes part in firing neuron B, then the connection between neuron A and B strengthens so that neuron A can more efficiently take part in firing neuron B". With this hypothesis, a technique can be derived to train a multi-layer physical neural network device without utilizing back-propagation or any other training algorithm, although the technique mirrors back-propagation in form. In fact, the resulting Knowm (i.e., physical neural network) is self-adaptable and does not require any calculations, derivates, or multiplication. The structure of a Knowm thus creates a situation in which learning simply takes place when a desired output is given. The description that follows is thus based on the use of a physical neural network (i.e., a Knowm) and constituent nanoconnections thereof.

Figure 13:
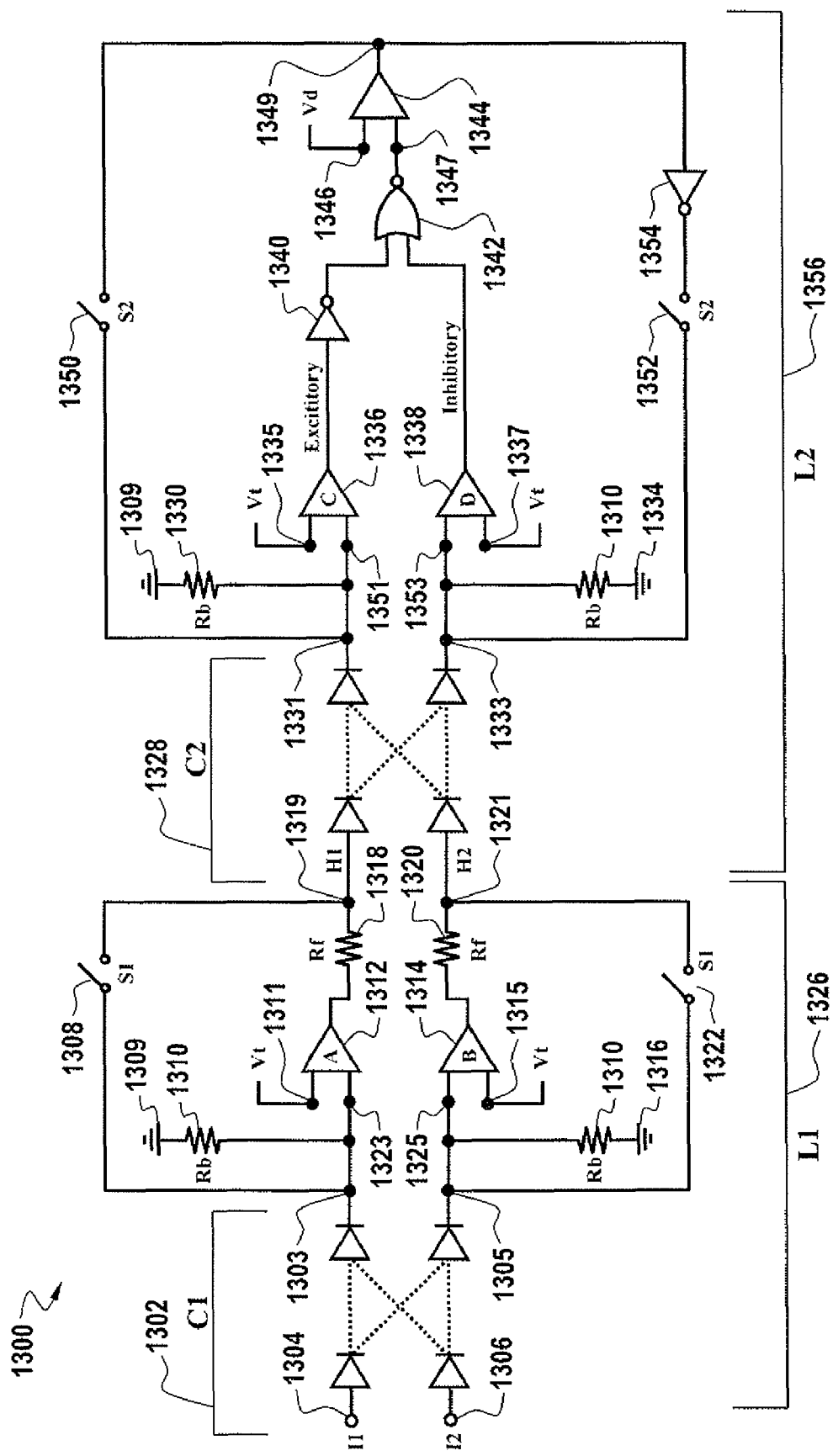
FIG. 13 illustrates a schematic diagram of a 2-input, 1-output, 2-layer inhibitory physical neural network, which can be implemented in accordance with a preferred embodiment of the present invention.

FIG. 13 illustrates a schematic diagram 1300 of a 2-input, 1-output, 2-layer inhibitory physical neural network, which can be implemented in accordance with a preferred embodiment of the present invention. As indicated in schematic diagram 1300 of FIG. 13, two layers 1326 and 1356 can be distinguished from one another. Note that as utilized herein, the term "layer" can be defined as comprising a connection network. Such a connection network can include one or more neurons in association with a plurality of nanoconductors present in a solvent, as explained herein. A neural network with two connection networks, for example, and only one layer of neurons can simulate any multitude of layers (e.g., inputs to neurons, neurons to outputs, and so forth).

In schematic diagram 1300, layers 1326 and 1356 are respectively labeled L1 and L2. Inputs 1304 and 1306 to a connection network 1302 are also indicated in schematic diagram 1300, wherein inputs 1304 and 1306 are respectively labeled I1 and I2 and connection network 1302 is labeled C1. Inputs 1304 and 1302 (i.e. I1 and I2) generally provide one or more signals, which can be propagated through connection network 1302 (i.e., C1). Connection network 1302 thus generates a first output signal at node 1303 and a second output signal at node 1305. The first output signal provided at node 1303 is further coupled to an input 1323 of an amplifier 1312, while the signal output signal provided at node 1305 is connected to an input 1325 of an amplifier 1314. Amplifier 1312 thus includes two inputs 1323 and 1311, while amplifier 1314 includes two inputs 1315 and 1325.

Note that a voltage $V_t$ can be measured at input 1311 to amplifier 1312. Similarly, voltage $V_t$ can also be measured at input 1315 to amplifier 1314. Additionally, a resistor 1316 can be coupled to node 1305 and a resistor 1310 is connected to node 1303. Resistor 1310 is further coupled to a ground 1309. Resistor 1316 is further connected to ground 1309. Resistors 1310 and 1316 are labeled $R_b$ in FIG. 13.

Amplifier 1312 thus functions as a neuron A and amplifier 1314 functions as a neuron B. The two neurons, A and B, respectively sum the signals provided at nodes 1303 and 1305 to provide output signals thereof at nodes 1319 and 1321 (i.e., respectively H1 and H2). Additionally, a switch 1308, which is labeled S1, is connected between nodes 1303 and 1319. Likewise, a switch 1322, which is also labeled S1, is connected between nodes 1305 and 1321. A resistor 1318 is coupled between an output of amplifier 1312 and node 1319. Similarly, a resistor 1320 is coupled between an output of amplifier 1314 and node 1321. Node 1319, which carries signal H1, is connected to a connection network 1328. Also, node 1321, which carries signal H2, is connected to connection network 1328.

Note that connection network 1328 is labeled C2 in FIG. 3. A first signal may be output from connection network 1328 at node 1331. Likewise, a second signal may be output from connection network 1328 at node 1333. A resistor 1330, which is labeled $R_b$, is coupled between node 1331 and ground 1309. Also, a resistor 1334, which is also labeled $R_b$, is connected between node 1333 and ground 1309. Node 1333 is further connected to an input 1353 to amplifier 1338, while node 1331 is further coupled to an input 1351 to amplifier 1336. Note that resistor 1330 is also coupled to input 1351 at node 1331, while resistor 1334 is connected to input 1353 at node 1333.

A voltage $V_t$ can be measured at an input 1335 to amplifier 1336 and an input 1337 to amplifier 1338. Amplifiers 1335 and 1338 can be respectively referred to as neurons C and D. An output from amplifier 1336 is connected to a NOT gate 1340, which provides a signal that is input to a NOR gate 1342. Additionally, amplifier 1338 provides a signal, which can be input to NOR gate 1342. Such a signal, which is output from amplifier 1338 can form an inhibitory signal, which is input to NOR gate 1342. Similarly, the output from amplifier 1336 can comprise an excitatory signal, which is generally input to NOT gate 1340. The excitatory and inhibitory signals respectively output from amplifiers 1336 and 1338 form an excitatory/inhibitory signal pair. NOR gate 1342 generates an output, which is input to an amplifier 1344 at input node 1347. A voltage $V_d$ can be measured at input node 1346, which is coupled to amplifier 1344.

Thus, the signals H1 and H2, which are respectively carried at nodes 1319 and 1321 are generally propagated through connection network 1328, which is labeled C2, where the signals are again summed by the two neurons, C and D (i.e., amplifiers 1336 and 1338). The output of these two neurons therefore form an excitatory/inhibitory signal pair, which through the NOT gate 1340 and the NOR gate 1342 are transformed into a signal output O1 as indicated at output 1348. Note that signal output node O1 can be measured at input node 1347 of amplifier 1344. Amplifier 1344 also includes an output node 1349, which is coupled to node 1331 through a switch 1350, which is labeled S2. Output 1349 is further coupled to a NOT gate 1354, which in turn provides an output which is coupled to node 133 through a switch 1352, which is also labeled S2.

For inhibitory effects to occur, it may be necessary to implement twice as many outputs from the final connection network as actual outputs. Thus, every actual output represents a competition between a dedicated excitatory signal and inhibitory signal. The resistors labeled $R_b$ (i.e., resistors 1330 and 1334) are generally very large, about 10 or 20 times as large as a nanoconnection. On the other hand, the resistors labeled $R_f$ (i.e., resistors 1318 and 1320) may possess resistance values that are generally less than that of a nanoconnection, although such resistances may be altered to affect the overall behavior of the associated physical neural network. $V_t$ represents the threshold voltage of the neuron while $V_d$ represents the desired output. S1 and S2 are switches involved in the training of layers 1 and 2 respectively (i.e., L1 and L2, which are indicated respectively by brackets 1326 and 1356 in FIG. 13).

For reasons that will become clear later, a typical training cycle can be described as follows: First an input vector can be presented at I1 and I2. For this particular example, such an input vector generally corresponds to only 4 possible combinations, 11, 10, 01 or 00. Actual applications would obviously require many more inputs, perhaps several thousand or more. One should be aware that the input vector does not have to occur in discrete time intervals, but can occur in real time. The inputs also need not necessarily be digital, but for the sake of simplicity in explaining this example, digital representations are helpful. While an input pattern is being presented, a corresponding output can be presented at $V_d$.

Again, in this particular case there is generally only one output with only two corresponding possible outcomes, 1 or 0. The desired output also does not have to be presented in discrete units of time. For learning to occur, the switches 1350 and 1352 (i.e., S2) may be closed, followed by switches 1308 and 1322 (i.e., S1). Both groupings of switches (S1 and S2) can then be opened and the cycle thereof repeated. Although only two layers L1 and L2 are illustrated in FIG. 13, it can be appreciated that a particular embodiment of the present invention may be configured to include many more layers. Thus, if more than two layers exist, then the switches associated with the preceding layer can be initially closed, then the second to last, the third to last and so on, until the last switch is closed on the input layer. The cycle is repeated. This "training wave" of closing switches occurs at a frequency determined by the user. Although it will be explained in detail later, the more rapid the frequency of such a training wave, the faster the learning capabilities of the physical neural network.

For example, it can be assumed that no connections have formed within connection networks C1 or C2 and that inputs are being matched by desired outputs while the training wave is present. Since no connections are present, the voltage at neurons A, B, C and D are all zero and consequently all neurons output zero. One can quickly realize that whether the training wave is present or not, a voltage drop will not ensue across any connections other than those associated with the input connection network. The inputs, however, are being activated. Thus, each input is seeing a different frequency. Connections then form in connection network C1, with the value of the connections essentially being random.

Before a connection has been made, the voltage incident on neurons A and B are zero, but after a connection has formed, the voltage jumps up to almost two diode drops short of the input voltage. This is because the connections are forming a voltage divider with $R_b$, such that $R_b$ (i.e., resistors 1310 and/or 1316) possesses a resistance very much larger than that of the nanoconnections. The primary reason for utilizing a large $R_b$ is to minimize power consumption of the physical neural network during a normal operation thereof. Fortunately, nanotube contact resistances are on the order of about 100 kΩ, which allows for an $R_b$ of a few MΩ. $V_t$ must be somewhere between two diode drops of the input voltage and the voltage produce by one nanoconnection in a voltage divider with $R_b$, the later being lower than the former.

Once connections have formed across C1 and grown sufficiently strong enough to activate neurons A and B, the connections across C2 will form in the same manner. Before continuing, however, it is important to determine what will occur to the nanoconnections of connection network 1302 (i.e., C1) after they grow strong enough to activate the first layer neurons. For the sake of example, assume that neuron A has been activated. When S1 is closed in the training wave, neuron A "sees" a feedback that is positive (i.e., activated). This locks the neuron into a state of activation, while S1 is closed. Because of the presence of diodes in connection network 1302 (i.e., C1), current can only flow from left to right in C1.

This results in the lack of a voltage drop across the nanoconnections. If another electric field is applied at this time to weaken the nanoconnections (e.g., perhaps a perpendicular connection), the nanoconnections causing activation to the neuron may be weakened (i.e., the connections running from positive inputs to the neuron are weakened) This feedback will continue as long as the connections are strong enough to activate the neuron (i.e., and no connections have formed in the second layer). Nanoconnections can thus form and be maintained at or near the values of neuron activation. This process will also occur for ensuing layers until an actual network output is achieved.

Although the following explanation for the training of the newly formed (and random) connections may appear unusual with respect to FIG. 13, it should be appreciated by those skilled in the art that the configuration depicted in FIG. 13 represents the smallest, simplest network available to demonstrate multi-layer training. A typical physical neural network can actually employ many more inputs, outputs and neurons. In the process of explaining training, reference is made to FIG. 13, but those skilled in the art can appreciate that an embodiment of the present invention can be implemented with more than simply two inputs and one output. FIG. 13 is thus presented for illustrative purposes only and the number of inputs, outputs, neurons, layers, and so forth, should not be considered a limiting feature of the present invention, which is contemplated to cover physical neural networks that are implemented with hundreds, thousands, and even millions of such inputs, outputs, neurons, layers, and so forth. Thus, the general principles explained here with respect to FIG. 13 can be applied to physical neural networks of any size.

It can be appreciated from FIG. 13 that neuron C (i.e., amplifier 1336) is generally excitatory and neuron D (i.e., amplifier 1338) is generally inhibitory. The use of NOT gates 1340 and 1354 and NOR gate 1342 create a situation in which the output is only positive if neuron C is high and neuron D zero (i.e., only if the excitatory neuron C is high and the inhibitory neuron D low). For the particular example described herein with respect to FIG. 13, where only one output is utilized, there generally exists a fifty-fifty chance that the output will be correct.

Recall, however, that in a typical physical neural network many more outputs are likely to be utilized. If the output is high when the desired output is low, then the training neuron (i.e., amplifier 1344, the last neuron on the right in FIG. 13) outputs a high signal. When S2 is closed during the training wave, this means that the post connections of the excitatory neuron will receive a high signal and the post connections of the inhibitory neuron a negative signal (i.e., because of the presence of NOT gate 1354). Note that through feedback thereof, each neuron will be locked into each state while S2 is closed. Because of the presence of diodes within connection network 1328 (i.e., C2), there will be no voltage drop across those connections going to the excitatory neuron. There will be a voltage drop, however, across the nanoconnections extending from positive inputs of C2 to the inhibitory neuron (i.e., amplifier 1338). This can result in increases in inhibitory nanoconnections and a decrease in excitatory nanoconnections thereof (i.e., if a perpendicular field is present). This is exactly what is desired if the desired output is low when the actual output is high.

A correspondingly opposite mechanism strengthens excitatory connections and weakens inhibitory connections if the desired output is high when the actual output is low. When the desired output matches the actual output, the training neurons output is undetermined and random, sometimes strengthening and sometimes weakening connections. This is not necessarily an undesirable result. By randomly activating both excitatory and inhibitory connections when the output matches the desired output, one prevents the connection values from degrading in the perpendicular electric field utilized in the training.

Thus far an explanation has been presented describing how the last layer of a physical neural network can in essence train itself to match the desired output. An important concept to realize, however, is that the activations coming from the previous layer are basically random. Thus, the last connection network tries to match essentially random activations with desired output activations. For reasons previously explained, the activations emanating from the previous layer do not remain the same, but fluctuate. There must then be some way to "tell" the layers preceding the output layer which particular outputs are required so that their activations are no longer random.

One must realize that neurons simply cannot fire unless a neuron in a preceding layer has fired. The activation of output neurons can be seen as being aided by the activations of neurons in previous layers. An output neuron "doesn't care" what neuron in the previous layer is activating it, so long as it is able to produce the desired output. If an output neuron must produce a high output, then there must be at least one neuron in the previous layer that both has a connection to it and is also activated, with the nanoconnection(s) being strong enough to allow for activation, either by itself or in combination with other activated neurons.

With this in mind, one can appreciate that the nanoconnections associated with pre-output layers may be modified. Again, by referring to FIG. 13, it can be appreciated that when S2 is closed (and S1 still open), $R_f$ may form a voltage divider with the connection of C2, with $R_b$ taken out of the picture. Recall that $R_f$ represents resistors 1318 and/or 1320, while $R_b$ represents resistors 1310 and/or 1316. Because of the diodes on every input and output of C2, only connections that go from a positive activation of neurons A and B to ground after C2 will allow current to flow. Recall as explained previously that only those nanoconnections that are required to be strengthened in the output connection matrix thereof will be negative, so that the voltage signals H1 and H2 measured respectively at nodes 1319 and 1321 are the direct result of how many neurons "need" to be activated in the output layer. By then closing S1, the previous layer neurons "know" how much of their activation signal is being utilized. If the signal is being used by many neurons in a preceding layer, or by only a few with very strong nanoconnections, then the voltage that the neuron receives as feedback when S1 is closed decreases to a point below the threshold of the neuron. Exactly what point this occurs at is dependent on the value of $R_f$ (i.e., resistors 1318 and/or 1320). As $R_f$ becomes larger, less resistance is generally required to lower H1 or H2 to a point below the threshold of the neuron. Thus, based on the foregoing, those skilled in the art can appreciate how nanoconnections in layers preceding the output layer can modify themselves.

Referring again to FIG. 13 as an example, if the voltage at H1 decreases to a point below $V_t$ when S2 is closed, then either neuron C or D (or both) will require the activation of neuron A to achieve the desired output. When S1 closes, neuron A receives the voltage at H1 as feedback, which is below the threshold of the neuron. This causes the neuron to output zero, which can again be transmitted by feedback to the neuron's input. Now the neuron is locked in a feedback loop constantly outputting zero. This causes an electric field to be generated across the connections of C1, from positive activations of I1 and/or I2 (i.e., inputs 1304 and/or 1306) to neuron A. Now the nanoconnections causing the activation of neuron A are even stronger. This allows neuron A to keep outputting a high signal that in turn allows the output neurons to match the desired output. Those skilled in the art can therefore appreciate that the same argument applies for neuron B, or any neuron in any layer preceding the output layer.

Although a detailed description of the process has been provided above, it is helpful to view the process from a generalized perspective. Again, assuming that no connections are present in any of the connection networks, assume that a series of input vectors are presented to the inputs of the network, and a series of output vectors are presented to the desired output, while the training wave is present. The training wave should be at a frequency equal or greater than the frequency at which input patterns are presented or otherwise the first few layers will not be trained and the network will be unable to learn the associations. The first layer connection network, analogous to C1 in FIG. 13, will begin to form connections, and continue to build connections until the sum of the connection hovers around the activation threshold for the succeeding neurons (amplifiers).

Once C1 connections have been created, C2 connections can be created in the same manner, this time with the input signals coming from the neuron activations of the preceding neurons. The connections will, just like C1, build up and hover around the threshold voltage for the succeeding neurons. This pattern of forming connections will generally occur until a signal is achieved at the output. Once a signal has been outputted, the feedback process begins and the training wave guides the feedback so that connections are modified strategically, from the output connection network to the input connection network, to achieve the desired output. The training is continued until the user is satisfied with the networks ability to correctly generate the correct output for a given input.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for training at least one connection network located between layers of a multi-layer physical neural network formed utilizing nanotechnology, said method comprising the steps of:
forming a multi-layer physical neural network having a plurality of inputs and a plurality outputs thereof, wherein said multi-layer physical neural network comprises a plurality of layers therein, such that each layer thereof comprises at least one connection network, wherein said at least one connection network comprises a plurality of nanoconnections suspended in a solvent;
initiating a training wave across said at least one connection network associated with an initial layer of said multi-layer physical neural network which propagates back through preceding connection networks of preceding layers of said multi-layer physical neural network by successively closing at least one switch associated with each layer of said multi-layer physical neural network; and
automatically providing at least one feedback signal thereof to each preceding connection network associated with each preceding layer thereof to strengthen or weaken nanoconnections of each connection network of said multi-layer physical neural network.

2. The method of claim 1 further comprising the step of:
forming a network structure from said multi-layer physical network, wherein said network structure automatically adapts itself to an input/output relationship thereof without the aid of external network error minimization.

3. The method of claim 1 further comprising the step of:
forming a network structure from said multi-layer physical network wherein information thereof is stored and processed by said at least one connection network, including said plurality of nanoconnections suspended in said solvent, thereby absolving a need for separate weight memory storage and processing architectures thereof.

4. The method of claim 1 wherein said solvent comprises at least one of the following types of solvents:
a dielectric solvent;
liquid crystal media; and
a gas.

5. The method of claim 1 wherein each nanoconnection of said plurality of nanoconnections comprises a nanoconductor.

6. The method of claim 1 wherein said nanoconductor comprises a nanotube.

7. The method of claim 1 wherein said nanoconductor comprises a nanowire.

8. The method of claim 1 wherein said nanoconductor comprises a plurality of nanoparticles.

9. The method of claim 1 wherein at least one neuron associated with said connection network comprises an inhibitory neuron.

10. The method of claim 1 wherein at least one neuron associated with said connection network comprises an excitatory neuron.

11. A method for training at least one connection network located between layers of a multi-layer physical neural network formed utilizing nanotechnology, said method comprising the steps of:
- forming a multi-layer physical neural network having a plurality of inputs and a plurality outputs thereof, wherein said multi-layer physical neural network comprises a plurality of layers therein, such that each layer thereof at least one connection network comprising a plurality of nanoconnections suspended in a dielectric solvent, wherein each nanoconnection of said plurality of nanoconnections comprises a nanoconductor and wherein at least one neuron associated with said connection network comprises at least one inhibitory neuron and at least one excitatory neuron;
- initiating a training wave across said at least one connection network associated with an initial layer of said multi-layer physical neural network which propagates back through preceding connection networks of preceding layers of said multi-layer physical neural network by successively closing at least one switch associated with each layer of said multi-layer physical neural network; and
- automatically providing at least one feedback signal thereof to each preceding connection network associated with each preceding layer thereof to strengthen or weaken nanoconnections of each connection network of said multi-layer physical neural network;
- forming a network structure from said multi-layer physical neural network, wherein said network structure automatically adapts itself to an input/output relationship thereof without the aid of external network error minimization; and
- wherein said network structure automatically adapts itself to an input/output relationship thereof without the aid of external digital network error minimization, such that information thereof is stored and processed by said at least one connection network, including said plurality of nanoconnections suspended in said solvent, thereby absolving a need for separate weight memory storage and processing architectures thereof.

12. A system for training at least one connection network located between layers of a multi-layer physical neural network formed utilizing nanotechnology, said system comprising:
- a multi-layer physical neural network having a plurality of inputs and a plurality outputs thereof, wherein said multi-layer physical neural network comprises a plurality of layers therein, wherein each layer thereof comprises at least one connection network comprising a plurality of nanoconnections suspended in a solvent; and
- a training wave initiated across said at least one connection network associated with an initial layer of said multi-layer physical neural network, which propagates back through preceding connection networks of preceding layers of said multi-layer physical neural network by successively closing at least one switch associated with each layer of said multi-layer physical neural network; and
- a feedback mechanism for automatically providing at least one feedback signal provided to each preceding connection network associated with each preceding layer thereof to strengthen or weaken nanoconnections of each connection network of said multi-layer physical neural network.

13. The system of claim 12 further comprising:
a network structure formed from said multi-layer physical network, wherein said network structure automatically adapts itself to an input/output relationship thereof without the aid of external network error minimization.

14. The system of claim 12 further comprising:
a network structure formed from said multi-layer physical network wherein information thereof is stored and processed by said at least one connection network, including said plurality of nanoconnections suspended in said solvent, thereby absolving a need for separate weight memory storage and processing architectures thereof.

15. The system of claim 12 wherein said solvent comprises at least one of the following:
a dielectric solvent;
liquid crystal medial; and
a gas.

16. The system of claim 12 wherein each nanoconnection of said plurality of nanoconnections comprises a nanoconductor.

17. The system of claim 12 wherein said nanoconductor comprises a nanotube.

18. The system of claim 12 wherein said nanoconductor comprises a nanowire.

19. The system of claim 12 wherein said nanoconductor comprises a plurality of carbon particles.

20. The system of claim 12 wherein at least one neuron associated with said connection network comprises an inhibitory neuron and/or an excitatory neuron.

* * * * *